US012063294B2

United States Patent
Dai et al.

(10) Patent No.: US 12,063,294 B2
(45) Date of Patent: Aug. 13, 2024

(54) METHOD FOR TRANSMITTING DATA BETWEEN INTERNET OF VEHICLES DEVICES AND DEVICE

(71) Applicant: Huawei Technologies Co., Ltd., Shenzhen (CN)

(72) Inventors: Wangchen Dai, Shenzhen (CN); Qinglong Zhang, Hangzhou (CN); Qianying Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 544 days.

(21) Appl. No.: 17/315,772

(22) Filed: May 10, 2021

(65) Prior Publication Data
US 2021/0281400 A1   Sep. 9, 2021

Related U.S. Application Data

(63) Continuation of application No. PCT/CN2019/101203, filed on Aug. 16, 2019.

(51) Int. Cl.
  *H04L 9/08* (2006.01)
  *H04L 9/40* (2022.01)
  *H04L 67/12* (2022.01)

(52) U.S. Cl.
  CPC ............ *H04L 9/0825* (2013.01); *H04L 9/083* (2013.01); *H04L 9/0894* (2013.01);
  (Continued)

(58) Field of Classification Search
  CPC .................................................. H04L 9/0825
  See application file for complete search history.

(56) References Cited

U.S. PATENT DOCUMENTS

| | | | |
|---|---|---|---|
| 2009/0150675 A1* | 6/2009 | Cook | H04L 63/0442 713/168 |
| 2010/0031042 A1 | 2/2010 | Di Crescenzo et al. | |

(Continued)

FOREIGN PATENT DOCUMENTS

| | | |
|---|---|---|
| CN | 104601329 A | 5/2015 |
| CN | 105246071 A | 1/2016 |

(Continued)

OTHER PUBLICATIONS

English translation for CN 104601329, 15 pages, translated: Feb. 22, 2022 (Year: 2022).*

(Continued)

*Primary Examiner* — Ponnoreay Pich
(74) *Attorney, Agent, or Firm* — Conley Rose, P.C.

(57) ABSTRACT

A method for transmitting data comprising a data requester sends, to a data sender, a data request that carries an identifier of the data requester and a category of requested data. After receiving the data request, the data sender generates an identifier public key using the identifier of the data requester and the category of the data. The data sender encrypts the data requested by the data requester using the identity public key, and sends the encrypted data and identity public key indication information to the data requester. The data requester decrypts the encrypted data using an identifier private key corresponding to the identifier public key to obtain the requested data, and the data requester performs decryption using the identifier private key.

20 Claims, 11 Drawing Sheets

(52) U.S. Cl.
CPC .......... *H04L 63/0442* (2013.01); *H04L 67/12* (2013.01); *H04L 2209/84* (2013.01)

(56) References Cited

U.S. PATENT DOCUMENTS

| | | | |
|---|---|---|---|
| 2017/0070485 | A1 | 3/2017 | Kumar et al. |
| 2018/0033218 | A1 | 2/2018 | Soni |
| 2019/0238322 | A1* | 8/2019 | Wang .................... H04L 63/126 |
| 2019/0260580 | A1 | 8/2019 | Chu et al. |
| 2019/0296902 | A1* | 9/2019 | Kumar .................... H04W 4/06 |
| 2020/0021431 | A1* | 1/2020 | Mondello ........... H04W 12/041 |
| 2020/0410113 | A1* | 12/2020 | Gryb ....................... H04L 9/302 |
| 2021/0281400 | A1* | 9/2021 | Dai ....................... H04L 9/0894 |

FOREIGN PATENT DOCUMENTS

| | | |
|---|---|---|
| CN | 108011715 A | 5/2018 |
| CN | 109791566 A | 5/2019 |
| CN | 110062354 A | 7/2019 |

OTHER PUBLICATIONS

"SM9 identity based cryptographic algorithms," GM/T 0044-2016 SM9, Cryptography Standardization Technical Committee, Mar. 10, 2018, 114 pages.

* cited by examiner

METHOD FOR TRANSMITTING DATA BETWEEN INTERNET OF VEHICLES DEVICES AND DEVICE

CROSS-REFERENCE TO RELATED APPLICATIONS

This application is a continuation of International Patent Application No. PCT/CN2019/101203 filed on Aug. 16, 2019, the disclosure of which is hereby incorporated by reference in its entirety.

TECHNICAL FIELD

This application relates to the field of communications technologies, and in particular, to a method for transmitting data between internet of vehicles devices and a device.

BACKGROUND

A public key infrastructure (PKI) performs public key management by using a certificate, and bundles a public key of a device and an identifier (ID) of the device together and writes the public key of the device and the identifier of the device into a certificate of the device by using a third-party trust authority such as a certificate authority (CA).

In internet of vehicles, information exchange between internet of vehicles devices usually has a security requirement, and a common data encryption mode is based on a PKI system.

A scenario in which a vehicle passes by a road facility in the internet of vehicles is used as an example to describe the data encryption mode that is based on the PKI system. When the vehicle drives into a range of the road facility, the road facility may request some data from the vehicle, for example, Global Positioning System (GPS) information and vehicle owner information of the vehicle.

The vehicle may determine whether the data requested by the road facility is information that needs to be encrypted. If the data is information that needs to be encrypted, the vehicle needs to further determine whether the road facility has permission to obtain the data. The vehicle needs to query from the CA and obtain a certificate of the road facility. After attempting to verify reliability of the certificate, the vehicle determines, based on the certificate, whether the road facility has the permission to obtain the data. If the road facility has the permission to obtain the data, the vehicle may encrypt the data by using a public key of the road facility that is recorded in the certificate and send the encrypted data to the road facility. After receiving the encrypted data, the road facility decrypts and obtains the data by using a private key.

As can be learned from the foregoing process, in information exchange between conventional internet of vehicles devices, a vehicle first needs to query a certificate and permission of a road facility from a CA before sending data to the road facility. Consequently, a data transmission process is time-consuming and inefficient.

SUMMARY

This application provides a method for transmitting data between internet of vehicles devices and a device, to resolve a problem of time-consuming and inefficient data transmission caused by a PKI-based encryption mode in an internet of vehicles scenario.

According to a first aspect, this application provides a method for transmitting data between internet of vehicles devices. The method may be applied to a scenario in which a first device and a second device in internet of vehicles interact with each other. The method includes receiving, by the first device, a data request from the second device, where the data request is used to request first data, and the data request may carry some necessary information, for example, an identifier of the second device and a category of the first data. After receiving the data request, if the first device needs to send the first data to the second device, the first device may first generate an identifier public key that carries the identifier of the second device and the category of the first data, then encrypt the first data by using the identifier public key, and then add identifier public key indication information and the encrypted first data to a data response and send the data response to the second device, where the identifier public key indication information is used to determine the identifier public key used to encrypt the first data.

According to the foregoing method, a data sender (the first device) performs encryption by using the identifier public key, a data requester (the second device) can perform decryption by using only an identifier private key, and the data sender no longer needs to frequently attempt to verify permission and a certificate of the data requester from a CA, thereby shortening a data transmission time and simplifying a data encryption process.

In a possible implementation, the identifier public key generated by the first device may include the time information, where the time information is used to indicate a valid time of the identifier public key, and the time information may be carried in the data request.

According to the foregoing method, the identifier public key carries the time information indicating the validity duration of the identifier public key, so that the identifier public key is valid only within a specific time period. In this way, identifier public keys in different time periods are different. Similarly, identifier private keys corresponding to identifier public keys in different time periods are also different, so that security of the identifier public key and the identifier private key can be ensured.

In a possible implementation, the identifier public key may further include an additional condition, where the additional condition is used to indicate a condition that needs to be met by the second device to decrypt the encrypted first data.

According to the foregoing method, a decryption action of the data requester (the second device) may be further restricted by adding the additional condition to the identifier public key, to ensure that the first data can be obtained by a data requester that meets the additional condition, thereby ensuring security of the first data.

In a possible implementation, there may be a plurality of additional conditions. This is not limited in this embodiment of this application. For example, the additional condition may restrict a time of decrypting the encrypted first data by the second device. In other words, the additional condition is a time condition that needs to be met by the second device for decryption. For example, the additional condition may be that the second device decrypts the encrypted first data within a specified time period. For another example, the additional condition may restrict a geographical location of the second device. In other words, the additional condition is a location condition that needs to be met by the second device for decryption. For example, the additional condition is that the second device decrypts the encrypted first data in a specified location.

According to the foregoing method, the additional condition may restrict a decryption time or a geographic location of the data requester, to implement restriction on the decryption action of the data requester (the second device), thereby ensuring security of the first data.

In a possible implementation, a category of information that needs to be encrypted may be preset in the first device, and before the first data is encrypted based on the identifier public key, it may be first determined whether the category of the first data belongs to a preset category of information that needs to be encrypted. If the category of the first data belongs to the preset category of the information that needs to be encrypted, the first device encrypts the first data based on the identifier public key. If the category of the first data does not belong to the preset category of the information that needs to be encrypted, the first device may directly send the first data to the second device without encrypting the first data.

According to the foregoing method, the category of the information that needs to be encrypted is preset, so that the first device may conveniently and quickly determine whether the first data needs to be encrypted, thereby effectively improving data transmission efficiency.

In a possible implementation, the first device can alternatively determine, based on triggering by a user, whether the first data needs to be encrypted. For example, the first device may first display a prompt, where the prompt prompts the user to determine whether the first data needs to be encrypted, and then the first device may receive an indication from the user, where the indication from the user corresponds to the prompt and is used to indicate that the first device needs to encrypt the first data.

According to the foregoing method, the first device may interact with the user to determine whether the first data needs to be encrypted, so that a data transmission process can meet a requirement of the user, helping improve user experience.

In a possible implementation, the data request may request a plurality of different categories of data. For example, the data request may be further used to request second data, and the identifier public key further includes a category of the second data. The first device may encrypt a data assembly based on the identifier public key, where the data assembly includes the first data and the second data. Then, the first device sends the data response to the second device, where the data response includes the identifier public key and the encrypted data assembly.

According to the foregoing method, the second device may request a plurality of different categories of data from the first device. Correspondingly, the first device may perform unified encryption on the plurality of different categories of data, to ensure data security.

According to a second aspect, this application provides a method for transmitting data between internet of vehicles devices. The method may be applied to a scenario in which a first device and a second device in internet of vehicles interact with each other. The method includes, when determining that first data needs to be requested from the first device, the second device may send a data request to the first device, where the data request is used to request the first data, and the data request includes an identifier of the second device and a category of the first data, then, the second device may receive a data response from the first device, where the data response includes identifier public key indication information and the encrypted first data, the identifier public key indication information is used to determine an identifier public key used for encrypting the first data, and the identifier public key includes the identifier of the second device and the category of the first data, and the second device decrypts the encrypted first data based on an identifier private key corresponding to the identifier public key, to obtain the first data.

According to the foregoing method, because a data sender (the first device) performs encryption by using the identifier public key, a data requester (the second device) needs to decrypt the requested data only by using the identifier private key, and if the data requester can obtain the identifier private key corresponding to the identifier public key, the data requester can decrypt the encrypted data, or if the data requester cannot obtain the identifier private key corresponding to the identifier public key, the data requester cannot decrypt the encrypted data, thereby ensuring data security and simplifying a data transmission process.

In a possible implementation, the identifier public key may include time information, and the time information is used to indicate a valid time of the identifier public key.

According to the foregoing method, the identifier public key carries the time information indicating the validity duration of the identifier public key, so that the identifier public key is valid only within a specific time period. In this way, identifier public keys in different time periods are different. Similarly, identifier private keys corresponding to identifier public keys in different time periods are also different, so that security of the identifier public key and the identifier private key can be ensured.

In a possible implementation, before decrypting the encrypted first data based on the identifier private key corresponding to the identifier public key, the second device needs to first obtain the identifier private key corresponding to the identifier public key. The second device may request the identifier private key from a key management center in advance. Alternatively, the second device may request the identifier private key from the key management center after sending the data request (for example, after receiving the data response). An example in which the second device requests the identifier private key from the key management center after sending the data request is used for description. If the second device does not locally store the identifier private key, the second device may send an identifier private key request to the key management center, where the identifier private key request includes the identifier public key, and then obtain the identifier private key from the key management center. A manner in which the second device requests the identifier private key from the key management center in advance is similar, and a difference lies in that the identifier private key request is sent before the data request is sent.

According to the foregoing method, only the second device that can obtain the identifier private key from the key management center can encrypt the encrypted first data, thereby ensuring security of the first data.

In a possible implementation, the identifier public key may further include an additional condition, and the additional condition is used to indicate a condition that needs to be met by the second device to decrypt the encrypted first data. When requesting the identifier private key from the key management center, the second device may add additional information to the identifier private key request, where the additional information is information that is provided by the second device and that can prove that the second device meets the additional condition.

According to the foregoing method, a decryption action of the data requester (the second device) may be restricted by adding the additional condition to the identifier public key, to ensure that the first data can be obtained by a data requester that meets the additional condition, thereby ensuring security of the first data.

In a possible implementation, if the additional condition is a time condition that needs to be met by the second device for decryption, for example, the additional condition is that the second device decrypts the encrypted first data within a specified time period, the additional information may be a decryption time estimated by the second device in advance, or may be a time at which the second device receives the data response.

If the additional condition is a location condition that needs to be met by the second device for decryption, for example, the additional condition is that the second device decrypts the encrypted first data in a specified location, the additional information is location information of the second device.

According to the foregoing method, the additional condition may limit a decryption time or a geographical location of the data requester. The additional information provided by the second device to the key management center may correspondingly prove the time and the geographical location at which the second device decrypts the encrypted first data, to prove that the second device can decrypt the encrypted first data, thereby further ensuring security of the first data.

In a possible implementation, the second device may request the identifier private key from the key management center in advance. The identifier private key obtained from the key management center may form an identifier private key set. The second device may locally store the identifier private key set, and the identifier private key set includes the identifier private key. Before decrypting the encrypted first data based on the identifier private key corresponding to the identifier public key, the second device may select the identifier private key from the locally stored identifier private key set based on the identifier public key.

According to the foregoing method, the second device may request the identifier private key from the key management center in advance. In this way, before the encrypted first data is decrypted, the identifier private key can be obtained more conveniently, and the first data can be obtained more quickly.

In a possible implementation, the data request is further used to request second data, the identifier public key further includes a category of the second data, the data response received by the second device further includes the identifier public key and an encrypted data assembly, and the data assembly includes the first data and the second data. The second device may decrypt the encrypted data assembly based on the identifier private key corresponding to the identifier public key, to obtain the first data and the second data.

According to the foregoing method, the second device may request different categories of data from the first device. Correspondingly, the first device may perform unified encryption on the different categories of data, to ensure data security.

According to a third aspect, an embodiment of this application further provides an internet of vehicles device. For beneficial effects, refer to descriptions of the first aspect, and details are not described herein again. The device has a function for implementing the actions in the method example of the first aspect. The function may be implemented by hardware, or may be implemented by hardware executing corresponding software. The hardware or the software includes one or more modules corresponding to the function. In a possible design, a structure of the device includes a receiving unit, an encryption unit, and a sending unit, and may further include a display unit. These units may perform a corresponding function in the method example of the first aspect. For details, refer to detailed descriptions in the method example. Details are not described herein.

According to a fourth aspect, an embodiment of this application further provides an internet of vehicles device. For beneficial effects, refer to descriptions of the second aspect, and details are not described herein again. The device has a function for implementing the actions in the method example of the second aspect. The function may be implemented by hardware, or may be implemented by hardware executing corresponding software. The hardware or the software includes one or more modules corresponding to the function. In a possible design, a structure of the device includes a sending unit, a decryption unit, and a receiving unit. These units may perform a corresponding function in the method example of the second aspect. For details, refer to detailed descriptions in the method example. Details are not described herein.

According to a fifth aspect, an embodiment of this application further provides a device. For beneficial effects, refer to descriptions of the first aspect, and details are not described herein again. A structure of the device includes a processor and a memory, the processor is configured to support the device in performing a corresponding function in the method in the first aspect, the memory is coupled to the processor and stores necessary program instructions and data of the device, and the structure of the device further includes a communications interface for communicating with another device.

According to a sixth aspect, an embodiment of this application further provides a device. For beneficial effects, refer to descriptions of the second aspect, and details are not described herein again. A structure of the device includes a processor and a memory, the processor is configured to support the device to perform a corresponding function in the method of the second aspect, the memory is coupled to the processor and stores necessary program instructions and data of the device, and the structure of the device further includes a communications interface for communicating with another device.

According to a seventh aspect, an embodiment of this application further provides a device. For beneficial effects, refer to descriptions of the first aspect, and details are not described herein again. A structure of the device includes a processor, an encryption module, and a memory, the processor and the encryption module may cooperate to perform a corresponding function in the method of the first aspect, the memory is coupled to the processor and stores necessary program instructions and data of the device, and the structure of the device further includes a communications interface for communicating with another device.

According to an eighth aspect, an embodiment of this application further provides a device. For beneficial effects, refer to descriptions of the second aspect, and details are not described herein again. A structure of the device includes a processor, a decryption module, and a memory, the processor and the decryption module may cooperate to perform a corresponding function in the method of the second aspect, the memory is coupled to the processor and stores necessary program instructions and data of the device, and the structure of the device further includes a communications interface for communicating with another device.

According to a ninth aspect, this application further provides a computer readable storage medium, where the computer readable storage medium stores an instruction, and when the instruction runs on a computer, the computer is enabled to perform the methods of the foregoing aspects.

According to a tenth aspect, this application further provides a computer program product including an instruction, where when the computer program product including the instruction runs on a computer, the computer is enabled to perform the method of the foregoing aspects.

According to an eleventh aspect, this application further provides a computer chip, where the chip is connected to a memory, and the chip is configured to read and execute a software program stored in the memory, to perform the methods of the foregoing aspects.

DESCRIPTION OF EMBODIMENTS

This application provides a method for transmitting data between internet of vehicles devices and a device, to resolve a problem of time-consuming and inefficient data transmission caused by a PKI-based encryption mode in an internet of vehicles scenario.

Figure 1:
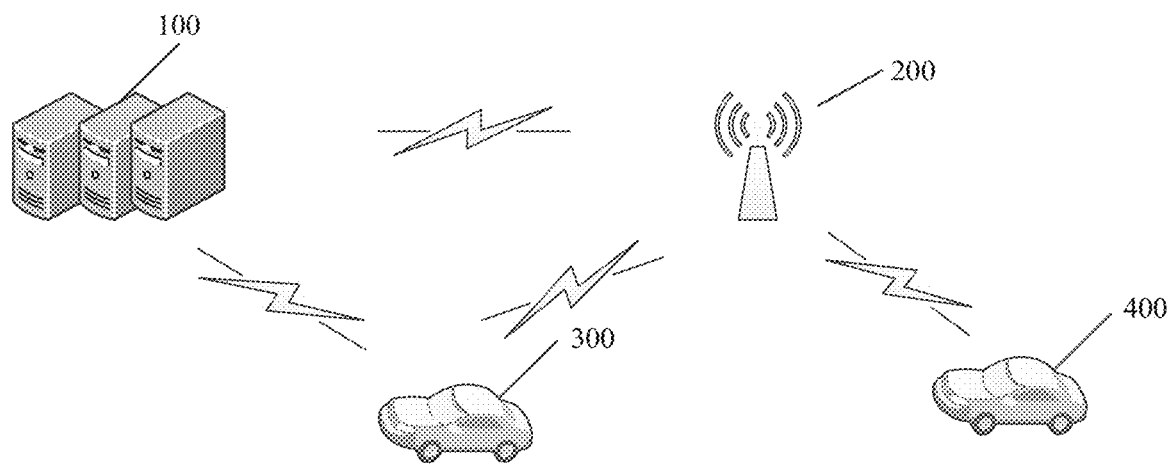
FIG. 1 is a schematic diagram of a system architecture according to an embodiment of this application.

FIG. 1 is a schematic architectural diagram of a system according to an embodiment of this application. The system includes a key management center 100, and may further include a plurality of internet of vehicles devices. FIG. 1 shows an example of three internet of vehicles devices: an internet of vehicles device 200, an internet of vehicles device 300, and an internet of vehicles device 400.

The key management center 100 is configured to allocate an identifier private key to an internet of vehicles device (such as the internet of vehicles device 200, the internet of vehicles device 300, and the internet of vehicles device 400) (in this embodiment of this application, a quantity of allocated identifier private keys is not limited). In this embodiment of this application, an identifier private key and an identifier public key are in a one-to-one correspondence, and the identifier private key and the identifier public key are used for encrypting and decrypting exchanged data when the internet of vehicles device exchanges the data. The identifier public key is well-known and can be obtained by any internet of vehicles device to encrypt one category of data or more different categories of data. The identifier private key can be obtained only by a corresponding internet of vehicles device and cannot be learned by another internet of vehicles device. The identifier private key can be used to decrypt data encrypted by using the identifier public key corresponding to the identifier private key. The identifier public key needs to include an identifier of an internet of vehicles device corresponding to the identifier public key, hence the names of "identifier private key" and "identifier public key". Correspondingly, the identifier private key corresponding to the identifier public key is generated based on the identifier public key, hence the name of identifier private key.

In this embodiment of this application, a manner of dividing data categories is not limited. For example, data exchanged between internet of vehicles devices may be roughly divided into four categories of information: vehicle information, vehicle owner information, road facility information, and road condition information. Each category of information may be divided into a plurality of different categories. Categories obtained by dividing the vehicle information include, but are not limited to: a vehicle license plate, a vehicle model, a vehicle driving speed, a vehicle driving path, a vehicle location, information recorded in an event data recorder of a vehicle, a quantity or ages of passengers in a vehicle, and the like. Categories obtained by dividing the vehicle owner information include, but are not limited to: a vehicle owner ID number, a driver' license, a vehicle owner's name, a vehicle owner's gender, a vehicle owner's age, a vehicle owner's driving experience, a point deduction record of a driver's license of a vehicle owner, and traffic violation information of a vehicle owner. Categories obtained by dividing the road facility information include, but are not limited to: a road facility device identifier, road facility location information, service information provided by a road facility (for example, when the road facility is an automatic toll station or an automatic filling station, the service information is a charging standard and a charged fee), and the like. Categories obtained by dividing the road condition information include, but are not limited to: road condition information of a road section, a time length of a traffic light, vehicle traffic of an intersection, vehicle traffic of a road section, and the like. The foregoing manner of dividing categories of data exchanged between internet of vehicles devices is only an example for description. In this application, another manner of dividing categories of data exchanged between internet of vehicles devices is not limited.

In this embodiment of this application, an identifier public key and a corresponding identifier private key may be associated with only one category, and the pair of the identifier public key and the identifier private key may be used to encrypt and decrypt data of the category. Alternatively, the identifier public key and the corresponding identifier private key may be associated with a category combination (where the category combination includes a plurality of categories). The pair of the identifier public key and the identifier private key may be used to encrypt and decrypt data assemblies of the plurality of categories.

For the identifier public key, a manner of allocating the identifier public key is not limited in this embodiment of this application. The identifier public key may be generated by the key management center 100 and distributed to the internet of vehicles device. In another possible implementation, an identifier public key generation rule may be preconfigured in each internet of vehicles device, and the internet of vehicles device generates the identifier public key.

A specific form of the internet of vehicles device is not limited in this embodiment of this application. Any device that needs to exchange data in an internet of vehicles scenario may be used as the internet of vehicles device. Vehicle information (for example, a vehicle identifier), road condition information, vehicle owner information, and the like may be transmitted between vehicles.

The internet of vehicles device may be alternatively a road facility. The road facility may be a speed measurement apparatus or a monitoring device disposed on a roadside, and can monitor a driving speed of a passing vehicle. The road facility may be alternatively a base station, and the base station may broadcast information to a passing vehicle and collect vehicle information, vehicle owner information, or the like of a passing vehicle. The road facility may be alternatively an intelligent traffic light disposed at an intersection. The intelligent traffic light may adjust a traffic light turning-on time based on real-time vehicle traffic of an intersection or a road section. The road facility may be alternatively an automatic toll station or an automatic filling station disposed on a roadside. The automatic toll station may obtain information about a passing vehicle and deduct a fee from the passing vehicle. The automatic filling station may obtain information about a vehicle that needs to be filled, and after verification of the information about the vehicle succeeds, may fill the vehicle and initiate a fee deduction request to the vehicle. In addition to interaction with a vehicle, the road facility may alternatively interact with another road facility. For example, for intelligent traffic lights of two adjacent intersections, one intelligent traffic light may send real-time vehicle traffic of an intersection or a road section to the other intelligent traffic light, and after receiving the vehicle traffic, the other intelligent traffic light may adjust a traffic light turning-on time based on the vehicle traffic of the intersection or the road section.

In the system architecture shown in FIG. 1, only an example in which the internet of vehicles device 200 is a road facility, and the internet of vehicles device 300 and the internet of vehicles device 400 are vehicles is used. A quantity and specific forms of the internet of vehicles devices included in the system are not limited in this embodiment of this application.

In this embodiment of this application, when the internet of vehicles devices exchange data, a data requester sends, to a data sender, a data request that carries an identifier of the data requester and a category of requested data. After receiving the data request, the data sender (an internet of vehicles device that sends the data) may determine an identity of the data requester based on the identifier of the data requester, and generate an identifier public key by using the identifier of the data requester and the category of the data requested by the data requester. Then, the data sender encrypts, by using the identifier public key, the data requested by the data requester, and sends the encrypted data and the identifier public key to the data requester. After receiving the encrypted data, the data requester may decrypt the encrypted data by using an identifier private key corresponding to the identifier public key, to obtain the requested data. The data requester needs to use only the identifier private key in decryption. The data sender no longer needs to frequently attempt to verify permission and a certificate of the data requester from a CA, and needs to encrypt the requested data by using only the identifier public key. If the data requester can obtain the identifier private key corresponding to the identifier public key, the data requester can decrypt the encrypted data. If the data requester cannot obtain the identifier private key corresponding to the identifier public key, the data requester cannot decrypt the encrypted data. This can ensure data security, effectively simplify a data transmission procedure, and improve data transmission efficiency in an internet of vehicles scenario.

In this embodiment of this application, the data requester obtains, in many manners, the identifier private key corresponding to the identifier public key. For example, the key management center 100 may allocate the identifier private key to the data requester in advance and send the identifier private key to the data requester. Alternatively, when interacting with the data sender, the data requester actively applies for the identifier private key from the key management center 100.

The following uses an example in which the internet of vehicles device 200 is a data requester and the internet of vehicles device 300 is a data sender. The manner in which the key management center allocates the identifier private key to the data requester in advance is first described, and then a process of data exchange between the internet of vehicles devices is described.

Figure 2:
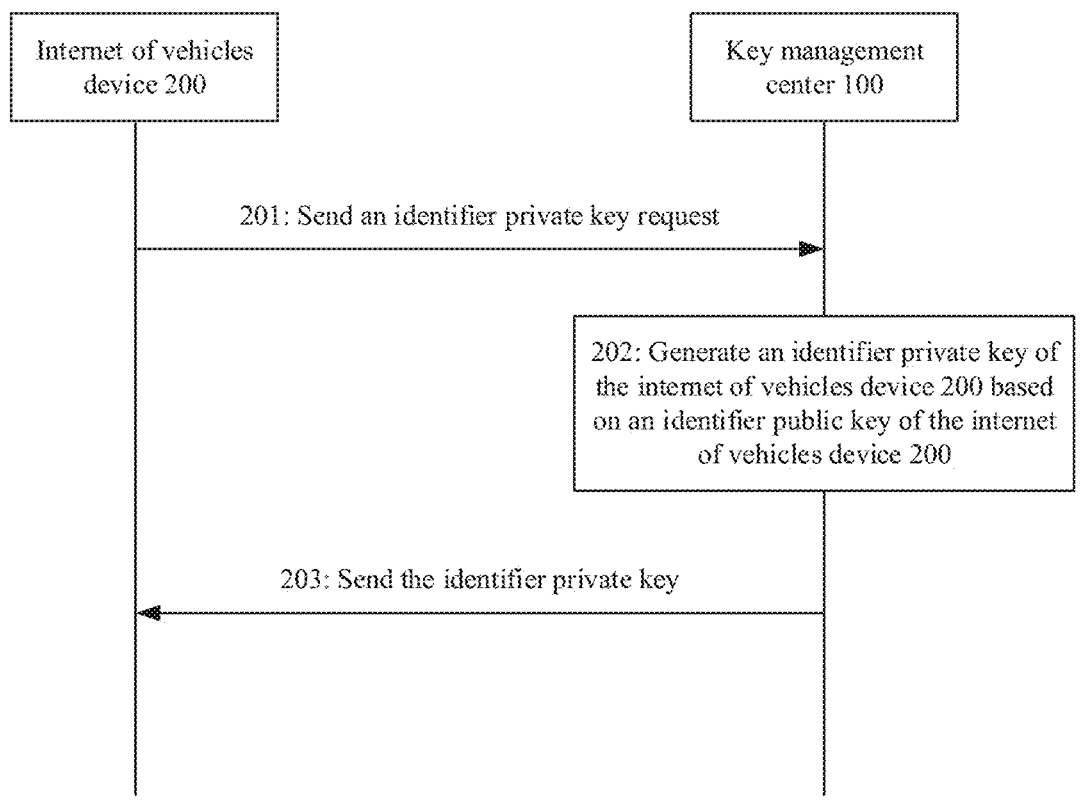
FIG. 2 is a schematic diagram of a method for allocating an identifier private key according to an embodiment of this application.

FIG. 2 shows a method for allocating, by a key management center, an identifier private key to an internet of vehicles device in advance. The method includes the following steps.

Step 201: An internet of vehicles device 200 sends an identifier private key request to a key management center 100, where the identifier private key request is used to request an identifier private key of the internet of vehicles device 200, the identifier private key request may carry an identifier public key, to indicate that the identifier private key requested by the identifier private key request is an identifier private key corresponding to the identifier public key, and the identifier public key includes an identifier of the internet of vehicles device 200.

In this embodiment of this application, a generation manner or a composition of the identifier public key is well-known, and the internet of vehicles device 200 may generate the identifier public key according to a preset identifier public key generation rule.

The following describes a composition of an identifier public key by using the identifier public key of the internet of vehicles device 200 as an example. In addition to the identifier of the internet of vehicles device 200, the identifier public key of the internet of vehicles device 200 may further include some or all of the following information: time information used to indicate a valid time of the identifier public key (and the identifier private key corresponding to the identifier public key), and a category associated with the identifier public key.

If the internet of vehicles device 200 is a vehicle, the identifier of the internet of vehicles device 200 may be a vehicle license plate or a vehicle identification number (VIN). If the internet of vehicles device 200 is a road facility, the identifier of the internet of vehicles device 200 may also be a road facility device identifier. A category of the identifier is not limited in this embodiment of this application. Any information that can identify the internet of vehicles device 200 is applicable to this embodiment of this application.

To ensure security of the identifier private key and the identifier public key, the identifier public key and the identifier private key of the internet of vehicles device 200 have a valid time (where the valid time may be determined by the key management center 100 in a unified manner). If a current moment is within the valid time, the identifier public key and the identifier private key of the internet of vehicles device 200 are valid, and may be used for data encryption and decryption. If a current moment is beyond the valid time, the identifier public key and the identifier private key of the internet of vehicles device 200 are invalid, and the identifier private key cannot be used to decrypt data encrypted by using the identifier public key. The identifier public key may indicate, by carrying the time information, the valid time of the identifier public key and the valid time of the identifier private key corresponding to the identifier public key.

A manner of representing the valid time by the time information is not limited in this embodiment of this application. For example, the time information may be a future time (which may be a precise month, a precise date, or a precise moment). Before the time arrives, the identifier public key of the internet of vehicles device 200 and the identifier private key corresponding to the identifier public key are valid. As time progresses, when the time arrives, the identifier public key of the internet of vehicles device 200 and the identifier private key corresponding to the identifier public key are invalid. Alternatively, the time information may be a start time and a time period, and indicates that the identifier public key of the internet of vehicles device 200 and the identifier private key corresponding to the identifier public key are valid in the time period beginning with the time, and the identifier public key of the internet of vehicles device 200 and the identifier private key corresponding to the identifier public key are invalid at a time beyond the time period beginning with the time.

Because the identifier public key of the internet of vehicles device 200 and the identifier private key corresponding to the identifier public key are associated with a specific category (or a category combination), the identifier public key can be used to encrypt data of the specific category (or a category combination). Correspondingly, the identifier private key corresponding to the identifier public key can be used to decrypt only the encrypted data of the specific category. The identifier public key may include the associated category, to represent an association between the identifier public key and the associated category (or a category combination).

It should be noted that the identifier private key request sent by the internet of vehicles device 200 to the key management center 100 may request all identifier private keys of the internet of vehicles device 200, or may request only some identifier private keys of the internet of vehicles device 200 in advance. For example, the identifier private key request may carry all identifier public keys of the internet of vehicles device 200, to indicate that the identifier private key requested by the identifier private key request is an identifier private key corresponding to each identifier public key. For another example, the identifier private key request may carry some identifier public keys of the internet of vehicles device 200, to indicate that the identifier private key requested by the identifier private key request is an identifier private key corresponding to each of the carried identifier public keys.

Categories of various data that the internet of vehicles device 200 is allowed to request may form a plurality of different category combinations. All the identifier public keys of the internet of vehicles device 200 include an identifier public key associated with each possible category combination, and all the identifier private keys of the internet of vehicles device 200 include an identifier private key corresponding to the identifier public key associated with each possible category combination. In other words, all the identifier private keys include an identifier private key corresponding to the identifier public key associated with each category combination of data that the internet of vehicles device 200 is allowed to request. For example, when the internet of vehicles device 200 has permission to request three categories: a vehicle driving speed, a vehicle location, and vehicle owner information, all request permission combinations of the internet of vehicles device 200 have at least $C_3^1+C_3^2+C_3^3=7$ identifier public keys based on different combination manners of categories. Correspondingly, there are seven identifier private keys.

In a possible implementation, for specific sorting of a plurality of categories in the identifier public key, different sorting manners of same categories also cause two identifier public keys to be different and identifier private keys corresponding to the two identifier public keys to be different. In other words, when two identifier public keys carry same categories and the plurality of categories are sorted differently, the identifier public keys are different. The example in which the internet of vehicles device 200 has permission to request three categories: a vehicle driving speed, a vehicle location, and vehicle owner information is still used. If sorting of a plurality of different categories in the identifier public key is considered, there are $A_3^1+A_3^2+A_3^3=15$ identifier public keys. Correspondingly, there are 15 identifier private keys.

For example, a composition rule of the identifier public key is: the identifier of the internet of vehicles device 200+the time information+a category, where the category may be any one of a category 1, a category 2, and a category 3, or any possible category combination of a plurality of categories of the category 1, the category 2, and the category 3. For example, the identifier of the internet of vehicles device 200 is HUAWEI 001, the time information is July, and the required data is a vehicle driving speed (or a speed), a vehicle location (or a location), and vehicle owner information. If a sorting manner of the plurality of categories in the identifier public key is not considered and only a combination manner of the plurality of categories is considered, the internet of vehicles device 200 has the following seven identifier public keys: HUAWEI 001-July-speed, HUAWEI 001-July-location, HUAWEI 001-July-vehicle owner information, HUAWEI 001-July-speed-location, HUAWEI 001-July-speed-vehicle owner information, HUAWEI 001-July-vehicle owner information-speed, and HUAWEI 001-July-speed-location-vehicle owner information. Correspondingly, all the identifier private keys of the internet of vehicles device 200 are identifier private keys corresponding to the seven identifier public keys.

If the sorting manner of the plurality of categories in the identifier public key is considered, the internet of vehicles device 200 has the following 15 identifier public keys: HUAWEI 001-July-speed, HUAWEI 001-July-location, HUAWEI 001-July-vehicle owner information, HUAWEI 001-July-speed-location, HUAWEI 001-July-location-speed, HUAWEI 001-July-speed-vehicle owner information, HUAWEI 001-July-vehicle owner information-speed, HUAWEI 001-July-location-vehicle owner information, HUAWEI 001-July-vehicle owner information-location, HUAWEI 001-July-speed-location-vehicle owner information, HUAWEI 001-July-location-speed-vehicle owner information, HUAWEI 001-July-location-vehicle owner information-speed, HUAWEI 001-July-vehicle owner information-location-speed, HUAWEI 001-July-vehicle owner information-speed-location, and HUAWEI 001-July-speed-vehicle owner information-location. Correspondingly, all the identifier private keys of the internet of vehicles device 200 are identifier private keys corresponding to the 15 identifier public keys.

It should be noted that the "HUAWEI 001-July-speed-location" and "HUAWEI 001-July-location-speed" are different identifier public keys. Although both the identifier public keys may be used to encrypt combined data of speed and location, because of different sorting manners of the categories carried in the two identifier public keys, the identifier public keys are different. Both the identifier public key "HUAWEI 001-July-speed-location" and the identifier public key "HUAWEI 001-July-location-speed" may be considered as an identifier public key associated with a combination of speed and location.

Step 202: After receiving the identifier private key request, the key management center 100 generates, based on the identifier public key of the internet of vehicles device 200, the identifier private key requested by the internet of vehicles device 200.

Before generating the identifier private key requested by the internet of vehicles device 200, the key management center 100 may first perform identity verification on the internet of vehicles device 200 to determine whether the internet of vehicles device 200 has permission to request the identifier private key, in other words, the key management center 100 determines whether a category of data that the internet of vehicles device 200 is allowed to request includes a category associated with the identifier private key. After determining that the internet of vehicles device 200 has permission to request the identifier private key (the identifier private key corresponding to the identifier public key), the key management center 100 generates the identifier private key requested by the internet of vehicles device 200.

The key management center 100 determines, in many manners, whether the internet of vehicles device 200 has permission to request the identifier private key. For example, an identifier of an internet of vehicles device having the permission to request the identifier private key, a category of data that each internet of vehicles device is allowed to request, and the like may be preconfigured in the key management center 100. The key management center 100 can query, based on the identifier of the internet of vehicles device 200 carried in the identifier private key request, the preconfigured identifier of the internet of vehicles device having the permission to request the identifier private key. If the preconfigured identifier of the internet of vehicles device having the permission to request the identifier private key includes the identifier of the internet of vehicles device 200, the internet of vehicles device 200 has the permission to request the identifier private key. Otherwise, the key management center 100 can reject the identifier private key request of the internet of vehicles device 200. Further, the key management center 100 can alternatively determine, based on the preconfigured category of the data that each internet of vehicles device is allowed to request, the identifier private key that can be obtained by the internet of vehicles device 200. In other words, the key management center 100 determines, based on the preconfigured category of the data that each internet of vehicles device is allowed to request, whether the internet of vehicles device 200 can obtain the identifier private key.

For another example, the key management center 100 may alternatively query registration information of the internet of vehicles device 200 based on the identifier of the internet of vehicles device 200 that is carried in the identifier private key request, and if the registration information of the internet of vehicles device 200 is found, determine, based on the registration information of the internet of vehicles device 200, whether the internet of vehicles device 200 has the permission to request the identifier private key. If the key management center 100 determines that the internet of vehicles device 200 does not have the permission to request the identifier private key, the key management center 100 may reject the identifier private key request of the internet of vehicles device 200.

The registration information of the internet of vehicles device 200 is relevant information of the internet of vehicles device 200 that the internet of vehicles device 200 registers with the key management center 100 and that is stored in the key management center 100. The registration information includes device information of the internet of vehicles device 200 such as the identifier of the internet of vehicles device 200, and may further include permission information of the internet of vehicles device 200 such as whether the identifier private key can be requested, and a category of data that the internet of vehicles device 200 is allowed to request.

The manner in which the key management center 100 determines whether the internet of vehicles device 200 has the permission to request the identifier private key is only an example. In this embodiment of this application, a specific manner in which the key management center 100 determines whether the internet of vehicles device 200 has the permission to request the identifier private key is not limited.

When generating the identifier private key corresponding to the identifier public key, the key management center 100 may generate the identifier private key of the internet of vehicles device 200 based on a preset key generation algorithm and the identifier public key of the internet of vehicles device 200. In this embodiment of this application, a specific category of the key generation algorithm is not limited. The key generation algorithm may be an identifier private key generation algorithm of an identity-based cryptograph (IBC) or identity-based encryption (IBE) standard algorithm, or another key generation algorithm.

Step 203: After generating the identifier private key requested by the internet of vehicles device 200, the key management center 100 sends the identifier private key to the internet of vehicles device 200, and the internet of vehicles device 200 receives the identifier private key and locally stores the identifier private key.

If the internet of vehicles device 200 requests identifier private keys corresponding to a plurality of identifier public keys, when sending the identifier private key to the internet of vehicles device 200, the key management center 100 may further send the identifier public key corresponding to the identifier private key, to indicate a correspondence between the identifier private key and the identifier public key.

The foregoing manner for sending the identifier private key is only an example. In this embodiment of this application, a manner in which the key management center 100 sends the identifier private key is not limited. Any manner that enables the internet of vehicles device 200 to obtain the identifier private key corresponding to the identifier public key is applicable to this embodiment of this application.

It should be noted that, in the embodiment shown in FIG. 2, the identifier private key request carries the identifier public key, to indicate the identifier public key corresponding to the identifier private key requested by the internet of vehicles device 200. In a possible implementation, when the internet of vehicles device 200 initiates the identifier private key request, the identifier private key request may carry a category of data that needs to be requested by the internet of vehicles device 200 and the identifier of the internet of vehicles device 200. A quantity of categories that are of the data that needs to be requested by the internet of vehicles device 200 and that are carried in the identifier private key request of data is not limited herein. The identifier private key request may carry one or more categories. For example, the internet of vehicles device 200 may add all possible categories of requested data to the identifier private key request.

If the identifier private key request carries one category of the data that the internet of vehicles device 200 needs to request, for example, the identifier private key request carries the category 1, after receiving the identifier private key request, the key management center 100 may first determine, by using the registration information of the internet of vehicles device 200, whether the internet of vehicles device 200 is allowed to obtain data of the category 1. If the internet of vehicles device 200 is allowed to obtain the data of the category 1, the key management center 100 generates, according to a preset identifier public key generation rule, an identifier public key 1 associated with the category 1 of the internet of vehicles device 200, generates a corresponding identifier private key based on the identifier public key 1, and sends the generated identifier private key to the internet of vehicles device 200. If the internet of vehicles device 200 is not allowed to obtain the data of the category 1, the key management center 100 may reject the identifier private key request.

If the identifier private key request carries a plurality of categories of the data that needs to be requested by the internet of vehicles device 200, herein, for example, the identifier private key request carries three categories and the three categories are the category 1, the category 2, and the category 3, after receiving the identifier private key request, the key management center 100 may first determine, by using the registration information of the internet of vehicles device 200, whether the internet of vehicles device 200 is allowed to obtain data of the category 1, the category 2, and the category 3. If the internet of vehicles device 200 is allowed to obtain the data of the category 1, the category 2, and the category 3, the key management center 100 generates, based on a preset identifier public key generation rule, an identifier public key associated with the category 1, the category 2, and the category 3 of the internet of vehicles device 200. Herein, it should be noted that because a pair of an identifier public key and an identifier private key may be associated with one or more categories, generation of the identifier public key and the identifier private key involves various possible category combinations. For descriptions of the various possible category combinations, refer to the foregoing content. Details are not described herein again.

For example, when requesting data, the internet of vehicles device 200 may separately request the data of the category 1, the category 2, and the category 3, or may request data of two or three of the category 1, the category 2, and the category 3. Correspondingly, the identifier public key of the internet of vehicles device 200 includes identifier public keys separately associated with the category 1, the category 2, and the category 3, or may include identifier public keys associated with two or three of the category 1, the category 2, and the category 3.

When determining the identifier public key of the internet of vehicles device 200, the key management center 100 may generate all possible identifier public keys, and generate an identifier private key based on each identifier public key. In other words, the key management center 100 first generates an identifier public key separately associated with each category and identifier public keys associated with different category combinations (where the category combinations include two or three of the category 1, the category 2, and the category 3), and then generates, based on each identifier public key, an identifier private key corresponding to the identifier public key, for example, an identifier private key separately associated with each category and identifier private keys associated with different category combinations. When generating the identifier public key of the internet of vehicles device 200, the key management center 100 may alternatively generate some identifier public keys, and generate an identifier private key based on each identifier public key, for example, generate only an identifier private key associated with each category or an identifier private key associated with each category combination.

Then, the key management center 100 sends the generated identifier private key to the internet of vehicles device 200. To indicate an identifier public key corresponding to each identifier private key, an associated category, or an associated category combination, while sending the identifier private key, the internet of vehicles device 200 may send the identifier public key corresponding to the identifier private key, or may send the associated category or the associated category combination.

If the internet of vehicles device 200 is not allowed to obtain the data of the category 1, the category 2, and the category 3, the key management center 100 may reject the identifier private key request. If the internet of vehicles device 200 is allowed to obtain only some of the categories, the key management center 100 may generate only an identifier private key associated with the some categories that the internet of vehicles device 200 is allowed to obtain.

In a possible implementation, when the internet of vehicles device 200 requests all identifier private keys of the internet of vehicles device 200 from the key management center 100, the identifier private key request may alternatively not carry all identifier public keys of the internet of vehicles device 200 or a category of data that needs to be requested, and instead carry indication information. The indication information is used to indicate that the identifier private key request is an identifier private key request that requests all the identifier private keys of the internet of vehicles device 200, for example, includes an identifier private key associated with a single category and identifier private keys associated with various possible category combinations. A manner of indicating the indication information is not limited in this embodiment of this application, and may be information agreed on by the internet of vehicles device 200 and the key management center in advance. For example, the indication information is a value 1. When the identifier private key request carries the value 1, it indicates that the internet of vehicles device 200 requests all the identifier private keys of the internet of vehicles device 200 from the key management center 100.

Figure 3:
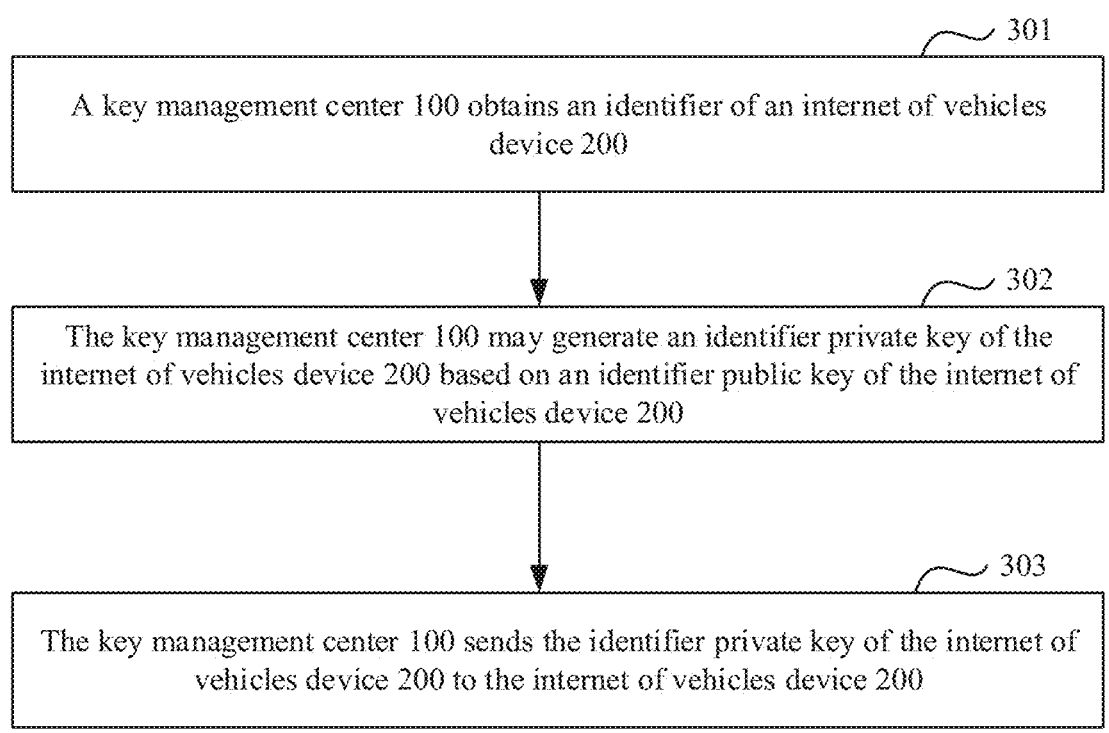
FIG. 3 is a schematic diagram of another method for allocating an identifier private key according to an embodiment of this application.

In the embodiment shown in FIG. 2, an example in which the internet of vehicles device 200 actively requests the identifier private key of the internet of vehicles device 200 from the key management center 100 is used for description. It should be understood that the key management center 100 may alternatively actively deliver the identifier private key to the internet of vehicles device 200. The following describes, with reference to FIG. 3, a manner in which the key management center 100 actively delivers the identifier private key according to an embodiment of this application. As shown in FIG. 3, the method includes the following steps.

Step 301: A key management center 100 obtains an identifier of an internet of vehicles device 200.

A manner in which the key management center 100 obtains the identifier of the internet of vehicles device 200 is not limited in this embodiment of this application. For example, the key management center 100 may send an identifier request to the internet of vehicles device 200, to request the identifier of the internet of vehicles device 200. After receiving the identifier request, the internet of vehicles device 200 may feed back the identifier of the internet of vehicles device 200 to the key management center 100.

For another example, in an internet of vehicles scenario, locations of some internet of vehicles devices, for example, road facilities such as a traffic light, an automatic toll station, and an automatic filling station are usually fixed. Some internet of vehicles devices such as police cars provide command and decision-making functions. These internet of vehicles devices generally need to relatively frequently exchange data with other internet of vehicles devices. To allocate an identifier private key to these internet of vehicles devices in time, the key management center 100 may locally store identifiers of these internet of vehicles devices in advance. For example, the identifiers of the internet of vehicles devices may be stored in registration information of the internet of vehicles devices, so that the key management center 100 can conveniently obtain the locally stored identifiers of the internet of vehicles devices. For example, the key management center 100 may pre-store the identifier of the internet of vehicles device 200.

Step 302: The key management center 100 may generate an identifier private key of the internet of vehicles device 200 based on an identifier public key of the internet of vehicles device 200, where the identifier public key of the internet of vehicles device 200 includes the identifier of the internet of vehicles device 200.

For a manner in which the key management center 100 generates the identifier private key of the internet of vehicles device 200 based on the identifier public key of the internet of vehicles device 200, refer to related descriptions in step 202. Details are not described herein again.

It should be noted that, a manner in which the key management center 100 obtains the identifier public key of the internet of vehicles device 200 is not limited in this embodiment of this application. The key management center 100 may generate the identifier public key of the internet of vehicles device 200 based on a preset identifier public key generation rule and the identifier of the internet of vehicles device 200. As can be learned from the embodiment shown in FIG. 2, in addition to the identifier of the internet of vehicles device 200, the identifier public key of the internet of vehicles device 200 may further include time information and a category of data that the internet of vehicles device 200 is allowed to request.

The key management center 100 may actively set the time information for the internet of vehicles device 200. For descriptions of the time information, refer to related descriptions in step 201. Details are not described herein again.

In an internet of vehicles scenario, an internet of vehicles device may allow other internet of vehicles devices to request different categories. In other words, the internet of vehicles device 200 may be allowed to obtain only data of one or more specific categories of other internet of vehicles devices. Before generating the identifier private key of the internet of vehicles device 200, the key management center 100 may first determine a category of data that the internet of vehicles device 200 is allowed to request. For example, the key management center 100 determines, based on the registration information of the internet of vehicles device 200, the category of the data that the internet of vehicles device 200 is allowed to request. Further, the key management center 100 may generate the identifier public key of the internet of vehicles device 200.

If the internet of vehicles device 200 is allowed to request a plurality of categories of data, there are a plurality of different combinations of the plurality of categories, and each pair of an identifier public key and an identifier private key may be associated with only one category or one possible category combination. The internet of vehicles device 200 has a plurality of different identifier public keys. The key management center 100 may generate some or all identifier public keys of the internet of vehicles device 200, and then generate a corresponding identifier private key based on the identifier public key. For descriptions about that the key management center 100 may generate some or all identifier public keys of the internet of vehicles device 200, refer to the foregoing content. Details are not described herein again.

Step 303: The key management center 100 sends the identifier private key of the internet of vehicles device 200 to the internet of vehicles device 200, and the internet of vehicles device 200 receives the identifier private key and locally stores the identifier private key. This is similar to step 203. For details, refer to related descriptions in step 203. Details are not described herein again.

As can be seen from the embodiments shown in FIG. 2 and FIG. 3, the internet of vehicles device 200 obtains the identifier private key from the key management center 100 relatively easily, and does not need to exchange data for a plurality of times, thereby simplifying an allocation process of the identifier private key.

Figure 4:
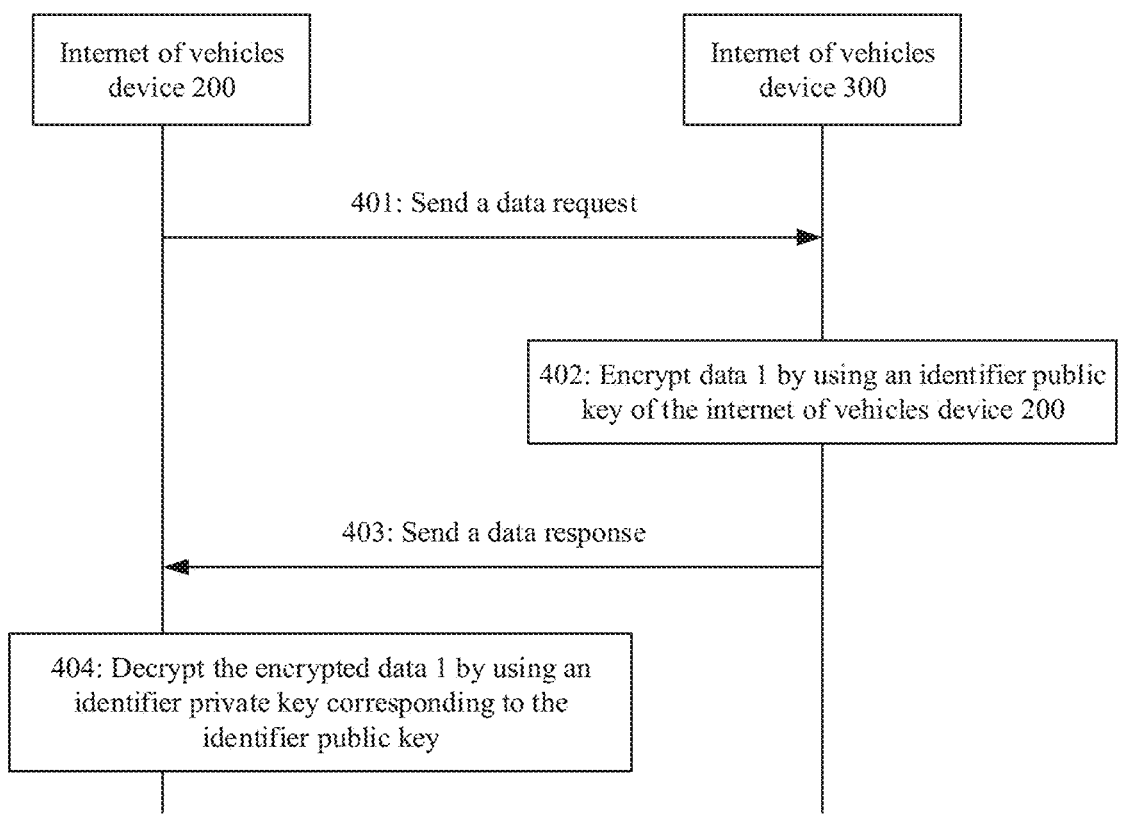
FIG. 4 is a schematic diagram of a method for transmitting data between internet of vehicles devices according to an embodiment of this application.

The following describes a process of interaction between two internet of vehicles devices with reference to FIG. 4 by using a process of interaction between the internet of vehicles device 200 and the internet of vehicles device 300 as an example. As shown in FIG. 4, the method includes the following steps.

Step 401: The internet of vehicles device 200 sends a data request to the internet of vehicles device 300, where the data request is used to request data 1, and the data request may include an identifier of the internet of vehicles device 200 and a category of the data 1. A manner in which the internet of vehicles device 200 sends the data request to the internet of vehicles device 300 is not limited in this embodiment of this application, and may be a unicast manner or a broadcast manner.

In information carried in the data request, the identifier of the internet of vehicles device 200 may indicate a transmit end of the data request, and the category of the data 1 may be used to indicate data requested by the data request.

The data request may further include time information. After receiving the data request, the internet of vehicles device 300 may learn, by using the time information, a valid time of the identifier public key used to encrypt the data 1.

The data request may alternatively not carry the time information. After time synchronization between the key management center 100 and each internet of vehicles device (including the internet of vehicles device 200), a valid time of the identifier public key of each internet of vehicles device is uniformly agreed on. For example, it may be agreed on that the identifier public key is updated every two days from July 27. In this way, the internet of vehicles device 300 can determine the time information based on a current time.

It should be understood that information carried in the data request, such as the identifier of the internet of vehicles device 200, the category of the data 1, and the time information can be directly carried in the data request. As can be learned from the foregoing content, the identifier public key may carry the identifier of the internet of vehicles device 200, the category of the data 1, and the time information. The data request may carry the identifier public key, to indicate information such as the identifier of the internet of vehicles device 200, the category of the data 1, and the time information.

Step 402. After receiving the data request, the internet of vehicles device 300 may encrypt the data 1 by using the identifier public key of the internet of vehicles device 200.

The internet of vehicles device 300 obtains the identifier public key of the internet of vehicles device 200 in many manners. For example, the internet of vehicles device 300 may obtain the identifier public key of the internet of vehicles device 200 from the data request.

For another example, alternatively, the internet of vehicles device 300 may request to obtain the identifier public key of the internet of vehicles device 200 from the internet of vehicles device 200. For example, when determining that the data 1 needs to be encrypted, the internet of vehicles device 300 may obtain the identifier public key of the internet of vehicles device 200 from the internet of vehicles device 200. Alternatively, the internet of vehicles device 300 may request to obtain the identifier public key of the internet of vehicles device 200 from the internet of vehicles device 200 in advance. For example, the internet of vehicles device 300 detects that the internet of vehicles device 200 is located in an area of the internet of vehicles device 300, and the internet of vehicles device 300 may request to obtain the identifier public key of the internet of vehicles device 200 from the internet of vehicles device 200 in advance.

For another example, the internet of vehicles device 300 may generate the identifier public key of the internet of vehicles device 200 according to a preset identifier public key generation rule. The internet of vehicles device 300 may be configured with the identifier public key generation rule, and may generate the identifier public key of the internet of vehicles device 200 according to the identifier of the internet of vehicles device 200, the category of the data 1, and the time information (where the time information may be carried in the data request or may be determined by the internet of vehicles device 300 based on a current time) carried in the data request.

For example, the identifier public key generation rule is the identifier of the internet of vehicles device 200+the time information+a category. If the identifier of the internet of vehicles device 200 carried in the data request is HUAWEI001, the time information carried in the data request is July, and the requested category carried in the data request is speed and GPS information, the generated identifier public key is HUAWEI001-July-speed-GPS.

In a possible implementation of this application, when the identifier public key is generated based on the category carried in the data request, and the data request carries a plurality of categories, different identifier public keys are generated if the plurality of categories are arranged in different orders. Therefore, a sequence of the categories in the identifier public key generated by the internet of vehicles device 300 may be determined in advance. The sequence may be a default sequence, for example, the categories are sorted in a sequence of the categories in the data request. Alternatively, the sequence may be agreed on by the internet of vehicles device 300 and the internet of vehicles device 200 during interaction. This is not limited in this application. Similarly, when determining the time information included in the identifier public key, the internet of vehicles device 300 needs to determine a format of the time information according to a specific rule. The rule may be a default rule, or may be agreed on between the internet of vehicles device 300 and the internet of vehicles device 200 during interaction. This is not limited in this application.

For example, if the identifier of the internet of vehicles device 200 that is carried in the data request is HUAWEI001, the category of the requested data is speed and GPS, and the time information is not carried, the internet of vehicles device 300 may determine the time information according to a current time and a previously agreed valid time of the identifier public key of the internet of vehicles device. If it is agreed on that the identifier public key is updated once a month, the valid time of the identifier public key is one month. The internet of vehicles device 300 may determine, based on a current month (for example, the current month is July), that the time information is July. In this case, the generated identifier public key is HUAWEI001-July-speed-GPS.

The foregoing manner in which the internet of vehicles device 300 obtains the identifier public key of the internet of vehicles device 200 is only an example for description. Any manner in which the identifier public key of the internet of vehicles device 200 can be obtained is applicable to this embodiment of this application.

The internet of vehicles device 300 may directly encrypt the data 1 by using the identifier public key of the internet of vehicles device 200, or may encrypt the data 1 by using the identifier public key of the internet of vehicles device 200 after determining that the category of the data 1 belongs to a preset category of information that needs to be encrypted.

A manner in which the internet of vehicles device 300 determines that the category of the data 1 belongs to a preset category of information that needs to be encrypted is not limited in this embodiment of this application. For example, the internet of vehicles device 300 may pre-store the category of the information that needs to be encrypted, and the category of the information that needs to be encrypted may be configured by a user, or may be obtained from the key management center 100 and stored. For example, the key management center 100 may periodically broadcast a message carrying the category of the information that needs to be encrypted. After receiving the message, the internet of vehicles device 300 may update, in real time, the locally stored category of the information that needs to be encrypted.

In a possible implementation, the internet of vehicles device 300 may determine, when triggered by a user, whether the data 1 needs to be encrypted.

Figure 5A:
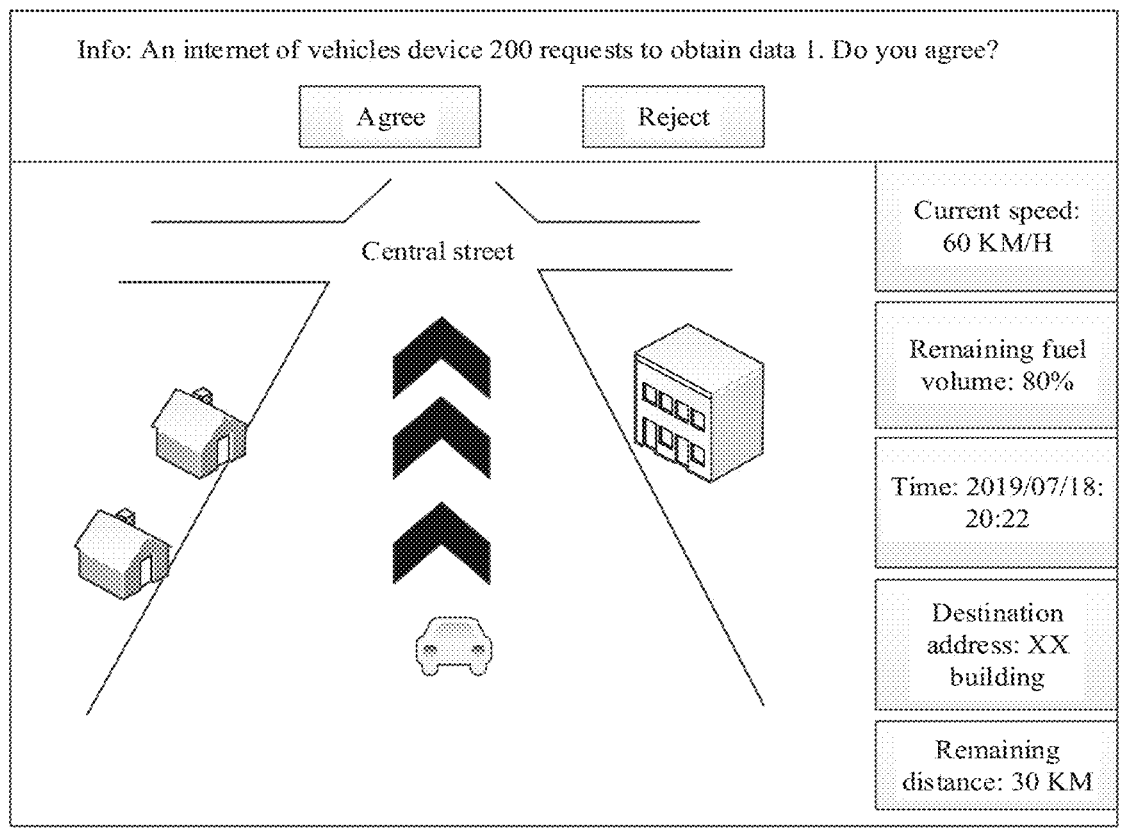
FIG. 5A is a schematic diagram of a display screen according to an embodiment of this application.

As shown in FIG. 5A, after receiving the data request, the internet of vehicles device 300 may present a display screen shown in FIG. 5A to a user. A central area of the display screen is a vehicle navigation screen, and displays image information such as a vehicle driving road. A right side of the display screen may display text information such as a current vehicle speed, a remaining fuel amount, a current time, a current desired driving destination address, and a remaining distance. An upper side of the display screen may display prompt information. As shown in FIG. 5A, "the internet of vehicles device 200 requests to obtain the data 1" is displayed, and the user is prompted to determine whether to agree to send the data 1. If the user taps "reject", the internet of vehicles device 300 may reject the request of the internet of vehicles device 200. If the user taps "agree", the internet of vehicles device 200 may encrypt the data 1 by using the identifier public key after determining that the category of the data 1 belongs to the preset category of the information that needs to be encrypted.

Figure 5B:
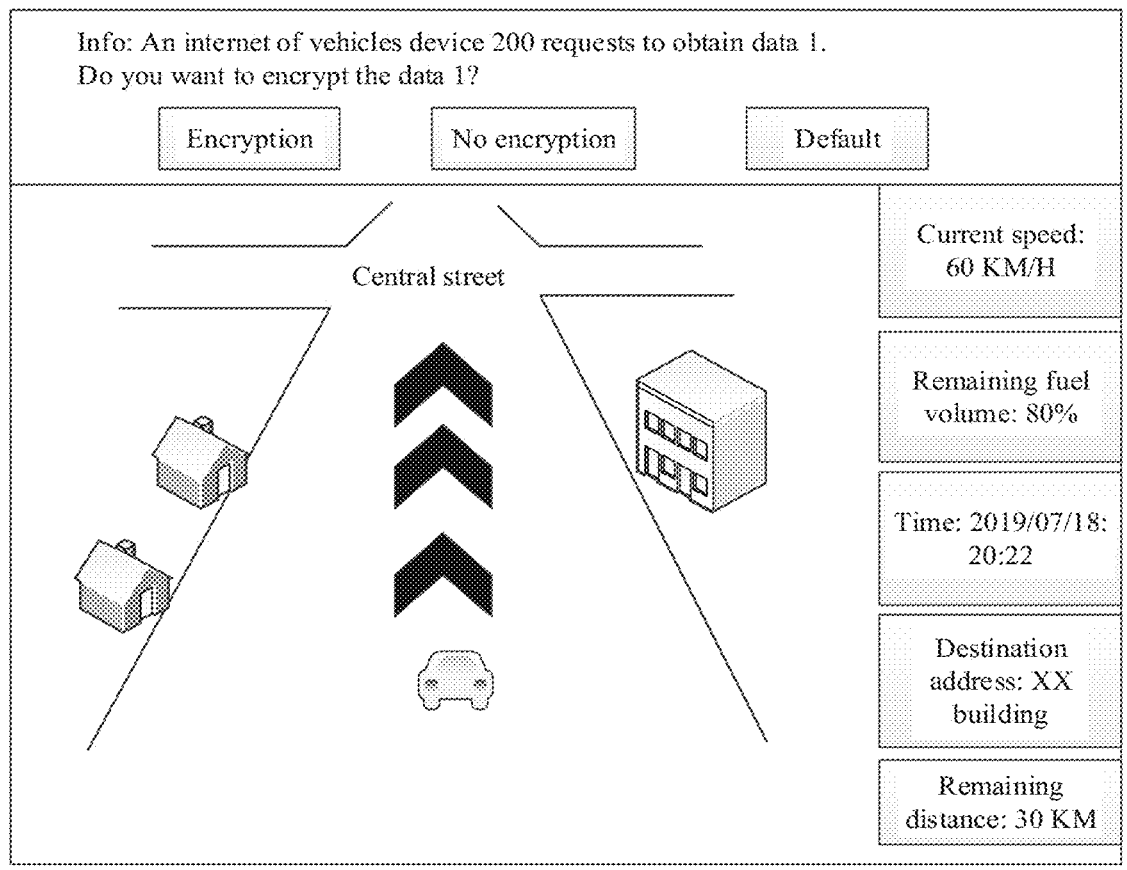
FIG. 5B is a schematic diagram of another display screen according to an embodiment of this application.

The internet of vehicles device 200 may alternatively prompt the user whether to encrypt the data 1, for example, display a screen shown in FIG. 5B. As shown in FIG. 5B, the internet of vehicles device 300 notifies the user that the internet of vehicles device 200 currently requests to obtain the data 1, and prompts the user whether the data 1 needs to be encrypted. If the user clicks "encrypt", the internet of vehicles device 300 may encrypt the data 1 by using the identifier public key. If the user clicks "not encrypt", the internet of vehicles device 300 may directly send the data 1 to the internet of vehicles device 200.

In addition to "encrypt" and "not encrypt", the display screen shown in FIG. 5B may further display another option "default". "Default" indicates that the internet of vehicles device 300 determines by itself whether the data 1 needs to be encrypted. If the user taps "default", the internet of vehicles device 300 may determine by itself whether the data 1 needs to be encrypted. For example, the internet of vehicles device 300 may encrypt the data 1 after determining that the category of the data 1 belongs to the preset category of the information that needs to be encrypted. If the user performs no operation within a preset time, the internet of vehicles device 300 may also determine by itself whether the data 1 needs to be encrypted. For a manner in which the internet of vehicles device 300 determines that the category of the data 1 belongs to the preset category of the information that needs to be encrypted, refer to the foregoing content. Details are not described herein again.

In the foregoing embodiment, an example in which the internet of vehicles device 300 prompts the user in a form of text information is used for description. Optionally, the internet of vehicles device 300 may alternatively prompt the user by playing a voice for the user, and recognize a voice of the user to determine an indication from the user.

It should be noted that the user may preset a category of data that another internet of vehicles device is not allowed to obtain. After receiving the data request, the internet of vehicles device 200 may first determine, based on setting of the user, whether the data 1 belongs to a category of data that the user allows the internet of vehicles device to obtain. If the category that is preset by the user and that is not allowed to be obtained includes the category of the data 1, the internet of vehicles device 300 can directly reject the data request. If the category that is preset by the user and that is not allowed to be obtained does not include the category of the data 1, after receiving the data request, the internet of vehicles device 300 may display the display screen shown in FIG. 5A or FIG. 5B to the user, so that the user may determine whether to perform encryption, or the internet of vehicles device 300 may determine by itself that the category of the data 1 belongs to the preset category of the information that needs to be encrypted, to determine whether the data 1 needs to be encrypted.

As can be learned from the foregoing content, the identifier public key may carry the identifier of the internet of vehicles device 200, the time information, and the category of the data 1. To ensure security and timeliness of the data 1, when generating the identifier public key the internet of vehicles device 200, the internet of vehicles device 300 may add an additional condition to the identifier public key. The additional condition is a condition that needs to be met by the internet of vehicles device 200 to decrypt the encrypted data 1.

For example, the additional condition may be that the internet of vehicles device 200 needs to decrypt the encrypted data 1 within a specified time. For example, the additional condition may be that the data requester needs to decrypt the encrypted data 1 within 24 hours. When receiving the encrypted data 1, the internet of vehicles device 300 needs to decrypt the encrypted data 1 within 24 hours. Otherwise, decryption cannot be performed. Alternatively, the additional condition may be that the internet of vehicles device 200 decrypts the encrypted data 1 in a specified location. For example, the additional condition may be that the data requester and the data sender need to be in a same preset range (for example, in a same city or in a same area). When the internet of vehicles device 200 receives the encrypted data 1, the encrypted data 1 can be decrypted only when the internet of vehicles device 300 and the internet of vehicles device 200 are in a same preset range. Otherwise, decryption cannot be performed.

The additional condition is carried in the identifier public key. Only an internet of vehicles device that can obtain or own the identifier private key corresponding to the identifier public key is an internet of vehicles device that meets the additional condition.

Step 403: The internet of vehicles device 300 sends a data response to the internet of vehicles device 200, where the data response includes the encrypted data 1 and identifier public key indication information, and the identifier public key indication information may be used to determine the identifier public key used to encrypt the data 1, namely, the identifier public key of the internet of vehicles device 200.

For example, the identifier public key indication information may be an identifier public key used to encrypt the data 1, or may be a generation rule of an identifier public key used to encrypt the data 1, or may be other information that can indicate the identifier public key used to encrypt the data 1.

Step 404: After receiving the data response, the internet of vehicles device 200 determines the identifier public key according to the identifier public key indication information, and decrypts the encrypted data 1 by using the identifier private key corresponding to the identifier public key, to obtain the data 1.

If the identifier public key indication information is the identifier public key used to encrypt the data 1, the internet of vehicles device 200 may directly obtain the identifier public key from the data response.

If the identifier public key indication information is the generation rule of the identifier public key used to encrypt the data 1, the internet of vehicles device 200 may generate the identifier public key based on the identifier public key indication information.

If the internet of vehicles device 200 applies, in advance, for an identifier private key corresponding to the identifier public key, the internet of vehicles device 200 may directly decrypt the data 1 by using the locally stored identifier private key.

If the internet of vehicles device 200 does not store the identifier private key corresponding to the identifier public key, in other words, the identifier private key of the identifier public key is not locally stored, the internet of vehicles device 200 may request, from the key management center 100, to obtain the identifier private key corresponding to the identifier public key.

For example, the internet of vehicles device 200 does not send, to the key management center 100 in advance, an identifier private key request carrying the identifier public key, and the key management center 100 does not actively allocate an identifier private key to the internet of vehicles device 200 either. When performing step 401 or after performing step 401, the internet of vehicles device 200 sends, to the key management center 100 by using the embodiment shown in FIG. 2, the identifier private key request carrying the identifier public key, and obtains, from the key management center 100, the identifier private key corresponding to the identifier public key. Certainly, the internet of vehicles device 200 may alternatively send, to the key management center 100 by using the embodiment shown in FIG. 2 after receiving the data response, the identifier private key request carrying the identifier public key, and obtain, from the key management center 100, the identifier private key corresponding to the identifier public key.

If the identifier public key carries the additional condition, because the additional condition is added by the internet of vehicles device 300, the internet of vehicles device 200 cannot learn of the additional condition in advance. In this case, the internet of vehicles device 200 cannot obtain, from the key management center 100 in advance, the identifier private key corresponding to the identifier public key. The internet of vehicles device 200 needs to initiate the identifier private key request to the key management center 100, to request the identifier private key corresponding to the identifier public key.

Figure 6:
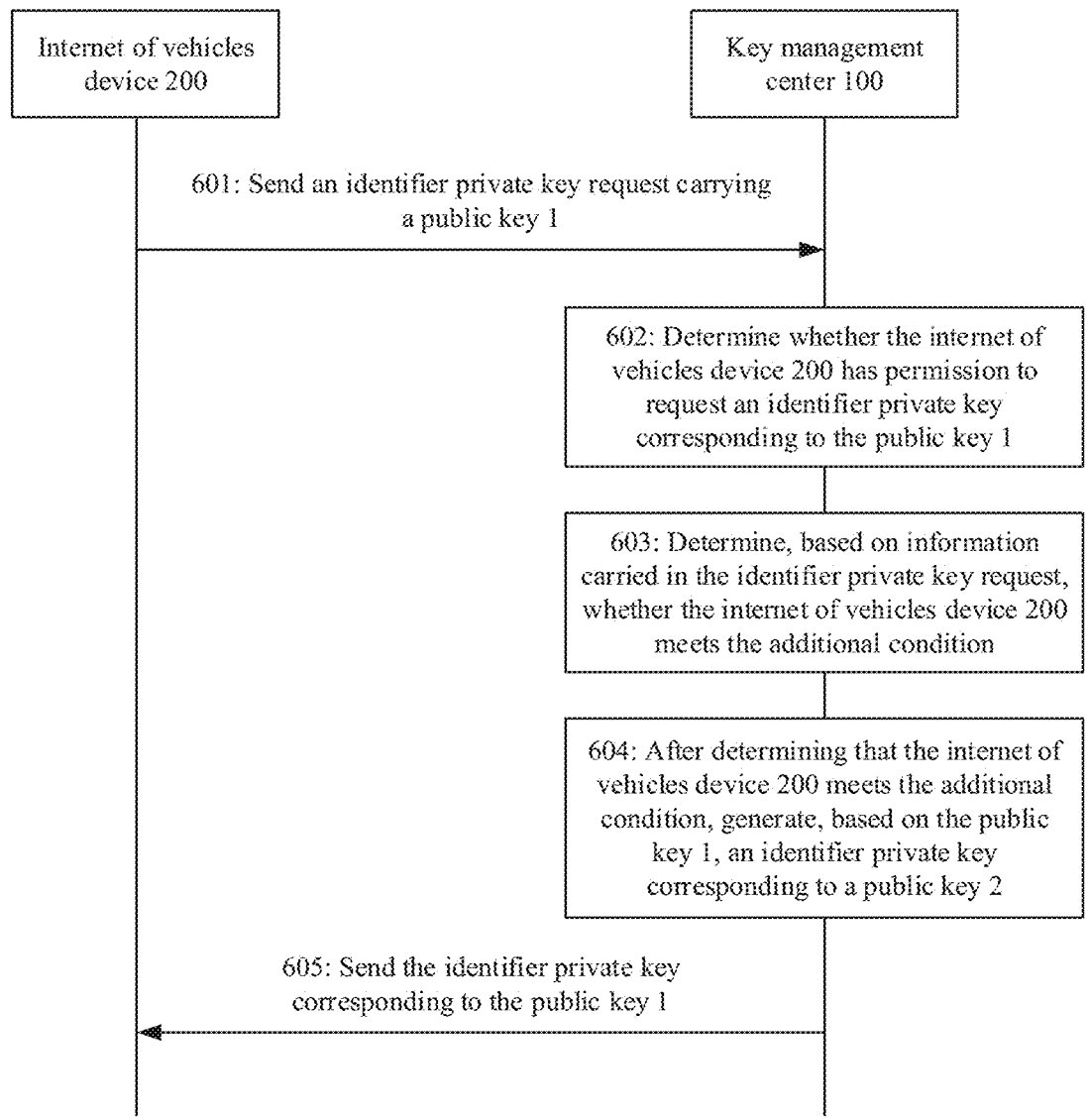
FIG. 6 is a schematic diagram of a method for requesting an identifier private key according to an embodiment of this application.

The following describes a manner in which when the identifier public key (for ease of description, the identifier public key carrying the additional condition is a public key 1) carries the additional condition, the internet of vehicles device 200 requests, from the key management center 100, to obtain an identifier private key corresponding to the identifier public key. Referring to FIG. 6, the method includes the following steps.

Step 601: The internet of vehicles device 200 sends, to the key management center, an identifier private key request that carries the public key 1.

The identifier private key request may further carry information that can prove that the internet of vehicles device 200 meets the additional condition. For example, the additional condition is that a data requester needs to decrypt encrypted data 1 within 24 hours, and the information may be a time that may be estimated by the internet of vehicles device 200 in advance and at which the internet of vehicles device 200 receives the data response. The additional condition is that the data requester and a data sender need to be in a same preset range (for example, in a same city or in a same area). The internet of vehicles device 200 may add location information of the internet of vehicles device 200 to the identifier private key request.

Step 602: After receiving the identifier private key request carrying the public key 1, the key management center 100 may determine whether the internet of vehicles device 200 has permission to request the identifier private key corresponding to the public key 1, for example, determine, based on registration information of the internet of vehicles device 200, whether the internet of vehicles device 200 has the permission to request the identifier private key, and determine whether the internet of vehicles device 200 is allowed to request a category of data associated with the public key 1. For a determining manner, refer to the embodiment shown in FIG. 2. Details are not described herein again.

Step 603: The key management center 100 determines, based on the information carried in the identifier private key request, whether the internet of vehicles device 200 meets the additional condition.

For example, the additional condition is that the data requester needs to decrypt the encrypted data 1 within 24 hours. The key management center 100 may determine whether a current time is within 24 hours that are after a time at which the internet of vehicles device 200 receives the data response. If the current time is within 24 hours that are after the time at which the internet of vehicles device 200 receives the data response, and the internet of vehicles device 200 has the permission to request the identifier private key corresponding to the public key 1, the key management center 100 may send the identifier private key of the public key 1 to the internet of vehicles device 200, and may perform step 604 and step 605. If the current time already exceeds 24 hours that are after the time at which the internet of vehicles device 200 receives the data response, or the internet of vehicles device 200 does not have the permission to request the identifier private key corresponding to the public key 1, the key management center 100 may reject the identifier private key request of the internet of vehicles device 200.

For another example, the additional condition is that the data requester and the data sender need to be in a same preset range (for example, in a same city or in a same area). The key management center 100 may further obtain location information of the internet of vehicles device 300 from the internet of vehicles device 300, and determine, according to the location information of the internet of vehicles device 200 and location information of the internet of vehicles device 300, whether the internet of vehicles device 200 meets the additional condition.

If the internet of vehicles device 200 meets the additional condition, the key management center 100 may send the identifier private key of the public key 1 to the internet of vehicles device 200, and may perform step 604 and step 605. If the internet of vehicles device 200 does not meet the additional condition, the key management center 100 may reject the identifier private key request of the internet of vehicles device 200.

Step 604: After determining that the internet of vehicles device 200 is allowed to request data of a category associated with the public key 1 and meets the additional condition, the key management center 100 generates, according to the public key 1, an identifier private key corresponding to the public key 1. A manner of generating, according to the public key 1, the identifier private key corresponding to the public key 1 is similar to the manner of generating the identifier private key in step 202. Refer to related descriptions in step 202. Details are not described herein again.

Step 605: The key management center 100 sends the identifier private key corresponding to the public key 1 to the internet of vehicles device 200, and the internet of vehicles device 200 receives the identifier private key and locally stores the identifier private key. For this step, refer to related descriptions in step 203. Details are not described herein again.

It should be noted that in the embodiment shown in FIG. 4, an example in which the data request requests only one category of data (the data 1) is used. In this embodiment of this application, a type of the category requested by the data request is not limited. If the data request requests a plurality of categories of data, such as the data 1 and data 2, in the embodiment shown in FIG. 4, the identifier public key is identifier public keys associated with the category of the data 1 and the category of the data 2. In a possible implementation, after receiving the data request, the internet of vehicles device 300 may also encrypt the data 1 by using the identifier public key associated with the category of the data 1 and encrypt the data 2 by using the identifier public key associated with the category of the data 2, and add the encrypted data 1 and the encrypted data 2 to the data response and send the data response to the internet of vehicles device 200. After receiving the data response, the internet of vehicles device 200 can separately decrypt the encrypted data 1 and the encrypted data 2 by using the corresponding identifier private key.

It should be noted that when the data request requests a plurality of categories of data, the internet of vehicles device 300 may separately determine whether each category of the data request belongs to a preset category of information that needs to be encrypted, and encrypt, by using an identifier public key associated with the preset category (or a category combination), data that belongs to the category of the information that needs to be encrypted, and may not encrypt and directly send data that does not belong to the preset category of the information that needs to be encrypted.

In the embodiment shown in FIG. 4, because the identifier private key may be associated with one or more specific categories, in a process of data transmission between the internet of vehicles device 200 and the internet of vehicles device 300, data may be encrypted and decrypted in a targeted manner to ensure data security. In addition, in the embodiment shown in FIG. 4, in the process of data transmission between the internet of vehicles device 200 and the internet of vehicles device 300, not all data needs to be encrypted and decrypted, to reduce a required data encryption and decryption time, thereby effectively improving data transmission efficiency in a subsequent data transmission process.

Figure 7:
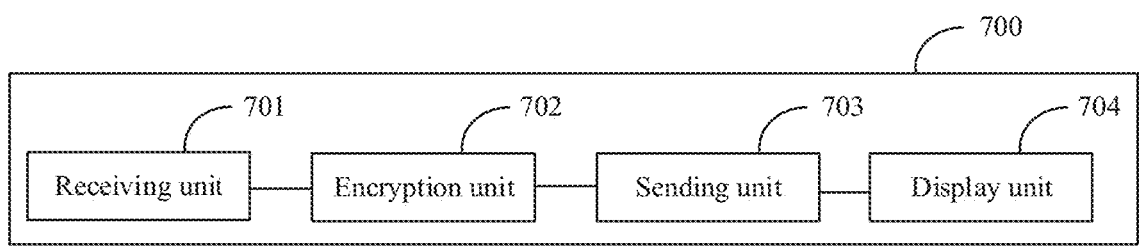
FIG. 7 is a schematic diagram of a structure of an internet of vehicles device according to an embodiment of this application.

Based on a same concept as that of the method embodiments, an embodiment of this application further provides an internet of vehicles device, configured to perform the method performed by the internet of vehicles device 300 in the foregoing method embodiments. For related features, refer to the foregoing method embodiments. Details are not described herein again. As shown in FIG. 7, an internet of vehicles device 700 includes a receiving unit 701, an encryption unit 702, and a sending unit 703.

The receiving unit 701 is configured to receive a data request from a second device, where the data request is used to request first data, and the data request includes an identifier of the second device and a category of the first data.

The encryption unit 702 is configured to encrypt the first data based on the identifier public key, where the identifier public key includes the identifier of the second device and the category of the first data.

The sending unit 703 is configured to send a data response to the second device, where the data response includes identifier public key indication information and the encrypted first data, and the identifier public key indication information is used to determine the identifier public key used to encrypt the first data.

The internet of vehicles device 700 further includes a display unit 704. The display unit 704 is configured to display a prompt, where the prompt is used to prompt a user to determine whether the first data needs to be encrypted, and receive an indication from the user, where the indication from the user is used to indicate that the first device encrypts the first data.

The internet of vehicles device 700 may be configured to perform the method performed by the internet of vehicles device 300 shown in FIG. 4. The receiving unit 701 may perform the method for receiving the data request by the internet of vehicles device 300 in step 402 in the embodiment shown in FIG. 4. The encryption unit 702 may perform the method for encrypting the data 1 by the internet of vehicles device 300 in step 402 in the embodiment shown in FIG. 4. The sending unit 703 may perform step 403 in the embodiment shown in FIG. 4.

Figure 8:
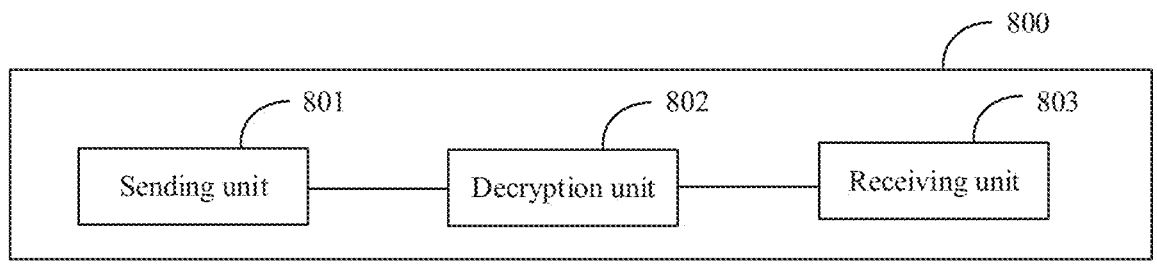
FIG. 8 is a schematic diagram of a structure of an internet of vehicles device according to an embodiment of this application.

Based on a same concept as that of the method embodiments, an embodiment of this application further provides an internet of vehicles device, configured to perform the method performed by the internet of vehicles device 200 in the foregoing method embodiments. For related features, refer to the foregoing method embodiments. Details are not described herein again. As shown in FIG. 8, an internet of vehicles device 800 includes a sending unit 801, a decryption unit 802, and a receiving unit 803.

The sending unit 801 is configured to send a data request to a first device, where the data request is used to request first data, and the data request includes an identifier of the second device and a category of the first data.

The receiving unit 803 is configured to receive a data response, where the data response includes identifier public key indication information and the encrypted first data, and the identifier public key indication information is used to determine the identifier public key used to encrypt the first data.

The decryption unit 802 is configured to decrypt the encrypted first data according to an identifier private key corresponding to the identifier public key.

The internet of vehicles device 800 may be configured to perform the method performed by the internet of vehicles device 200 in the embodiment shown in FIG. 2. The sending unit 801 may perform step 201 in the embodiment shown in FIG. 2. The receiving unit 803 may perform step 203 in the embodiment shown in FIG. 2.

The internet of vehicles device 800 may also be configured to perform the method performed by the internet of vehicles device 200 in the embodiment shown in FIG. 3. The receiving unit 803 may perform the method for receiving the identifier private key by the internet of vehicles device 200 from the key management center in step 303 in the embodiment shown in FIG. 3.

The internet of vehicles device 800 may also be configured to perform the method performed by the internet of vehicles device 200 in the embodiment shown in FIG. 4. The sending unit 801 may perform the method for sending the data request by the internet of vehicles device 200 in step 401 in the embodiment shown in FIG. 4. The receiving unit 803 may perform the method for receiving the data response by the internet of vehicles device 200 in step 404 in the embodiment shown in FIG. 4. The decryption unit 802 may perform the method for decrypting the encrypted data 1 by the internet of vehicles device 200 in step 404 in the embodiment shown in FIG. 4.

The internet of vehicles device 800 may also be configured to perform the method performed by the internet of vehicles device 200 in the embodiment shown in FIG. 6. The sending unit 801 may perform step 601 in the embodiment shown in FIG. 6. The receiving unit 803 may perform the method for receiving the identifier private key by the internet of vehicles device 200 from the key management center in step 605 in the embodiment shown in FIG. 6.

It should be noted that, in this embodiment of this application, unit division is exemplary, and is merely a logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

Figure 9:
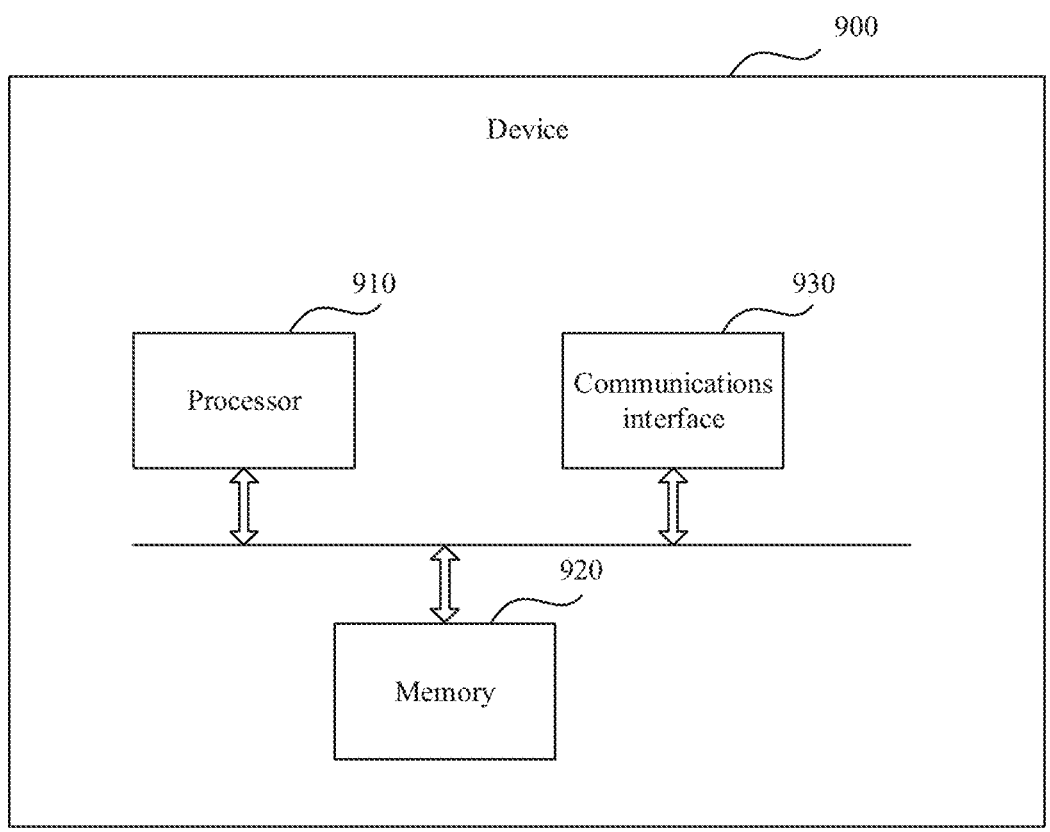
FIG. 9 is a schematic diagram of a structure of a device according to an embodiment of this application.

In a simple embodiment, a person skilled in the art may know that all the internet of vehicles devices (the internet of vehicles device 200 or the internet of vehicles device 300) in the foregoing embodiments may be in a form shown in FIG. 9.

A device 900 shown in FIG. 9 includes at least one processor 910 and a memory 920, and optionally, may further include a communications interface 930.

The memory 920 may be a volatile memory, such as a random access memory, or the memory may be a non-volatile memory, such as a ROM, a flash memory, a hard disk drive (HDD), or a solid-state drive (SSD), or the memory 920 is any other medium that can be configured to carry or store desired program code in a form of instructions or data structures and that can be accessed by a computer, but is not limited thereto. The memory 920 may be a combination of the foregoing memories.

In this embodiment of this application, a specific connection medium between the processor 910 and the memory 920 is not limited.

The device shown in FIG. 9 further includes the communications interface 930, and when communicating with another device, the processor 910 may perform data transmission by using the communications interface 930.

When the internet of vehicles device 300 uses the form shown in FIG. 9, the processor 910 in FIG. 9 may invoke a computer-executable instruction stored in the memory 920, so that the device 900 can perform the method performed by the internet of vehicles device 300 in any one of the foregoing method embodiments. For example, the device 900 may perform the method performed by the internet of vehicles device 300 in step 401 and step 403 in the method embodiment shown in FIG. 4.

Further, functions/implementation processes of the sending unit, the receiving unit, and the encryption unit in FIG. 7 may all be implemented by the processor 910 in FIG. 9 by invoking the computer-executable instruction stored in the memory 920. Alternatively, the function/the implementation process of the encryption unit in FIG. 7 may be implemented by the processor 910 in FIG. 9 by invoking the computer-executable instruction stored in the memory 920, and the functions/the implementation processes of the sending unit and the receiving unit in FIG. 7 may be implemented by the communications interface 930 in FIG. 9.

When the internet of vehicles device 200 uses the form shown in FIG. 9, the processor 910 in FIG. 9 may invoke the computer-executable instruction stored in the memory 920, so that the device 900 can perform the method performed by the internet of vehicles device 200 in any one of the foregoing method embodiments. For example, the device 900 may perform the method performed by the internet of vehicles device 200 in step 201 and step 203 in the method embodiment shown in FIG. 2, or perform the method performed by the internet of vehicles device 200 in step 402 and step 404 in the method embodiment shown in FIG. 4, or perform the method performed by the internet of vehicles device 200 in step 601 and step 605 in the method embodiment shown in FIG. 6.

Further, functions/implementation processes of the sending unit, the receiving unit, and the decryption unit in FIG. 8 may all be implemented by the processor 910 in FIG. 9 by invoking the computer-executable instruction stored in the memory 920. Alternatively, the function/the implementation process of the decryption unit in FIG. 8 may be implemented by the processor 910 in FIG. 9 by invoking the computer-executable instruction stored in the memory 920, and the functions/the implementation processes of the sending unit and the receiving unit in FIG. 8 may be implemented by the communications interface 930 in FIG. 9.

Figure 10:
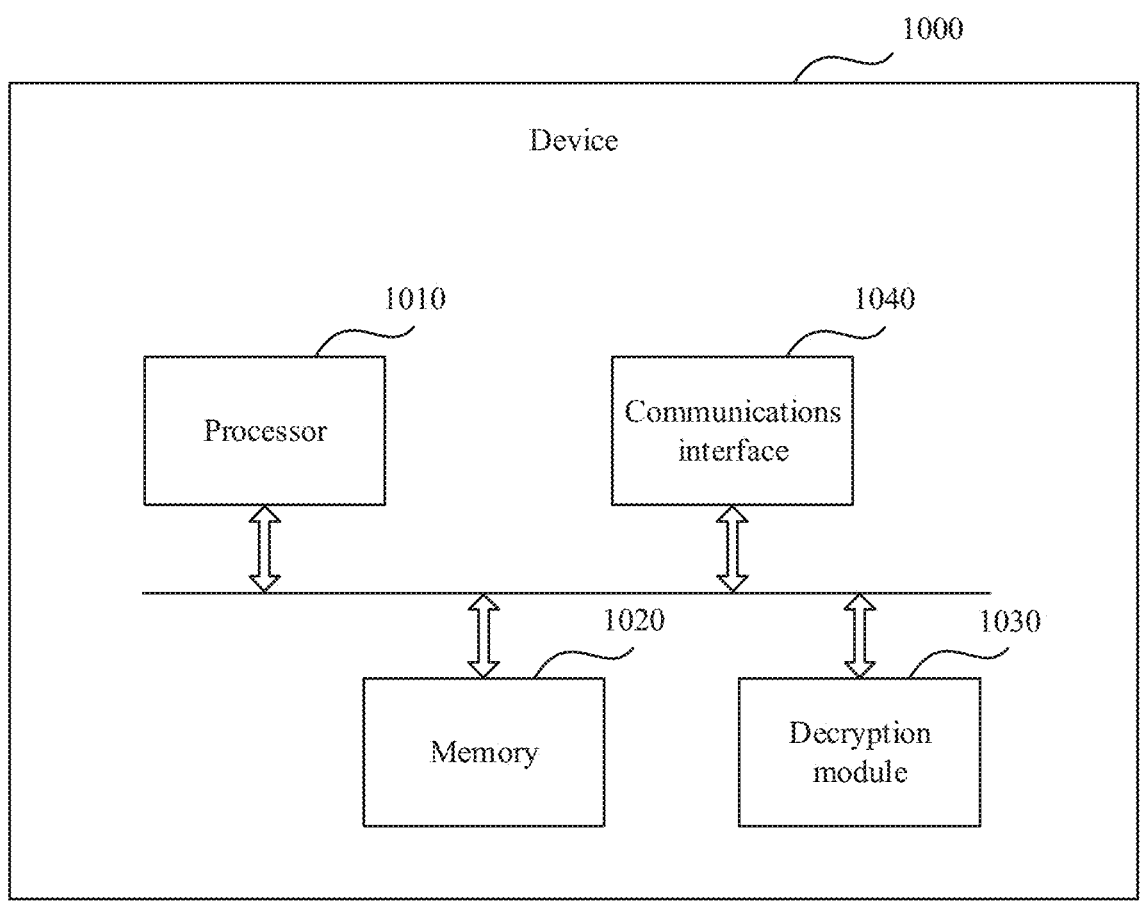
FIG. 10 is a schematic diagram of a structure of a device according to an embodiment of this application.

In a simple embodiment, the internet of vehicles device 200 may be alternatively in a form shown in FIG. 10.

A device 1000 shown in FIG. 10 includes at least one processor 1010, a memory 1020, and a decryption module 1030, and optionally, may further include a communications interface 1040.

The memory 1020 is similar to the memory 920. Refer to the foregoing descriptions of the memory 920. Details are not described herein again.

In this embodiment of this application, a specific connection medium between the processor 1010 and the memory 1020 is not limited.

The device shown in FIG. 10 further includes the communications interface 1040, and when communicating with another device, the processor 1010 may perform data transmission by using the communications interface 1040.

When the internet of vehicles device 200 uses the form shown in FIG. 10, the processor 1010 in FIG. 10 may invoke a computer-executable instruction stored in the memory 1020, so that the device 1000 can perform the method performed by the internet of vehicles device 200 in any one of the foregoing method embodiments. For example, the device 1000 may perform the method performed by the internet of vehicles device 200 in step 201 and step 203 in the method embodiment shown in FIG. 2, or perform the method for receiving the data request and sending the data response by the internet of vehicles device 200 in step 402 and step 404 in the method embodiment shown in FIG. 4, or perform the method performed by the internet of vehicles device 200 in step 601 and step 605 in the method embodiment shown in FIG. 6. The decryption module 1030 is configured to perform the method for encrypting the data 1 by the internet of vehicles device 200 in step 402 in the method embodiment shown in FIG. 4.

Further, functions/implementation processes of the sending unit and the receiving unit in FIG. 8 may all be implemented by the processor 1010 in FIG. 10 by invoking the computer-executable instruction stored in the memory 1020, and a function/an implementation process of the decryption unit may all be implemented by the decryption module 1030 in FIG. 10. Alternatively, a function/an implementation process of the decryption unit in FIG. 8 may be implemented by the decryption module 1030 in FIG. 10, and functions/implementation processes of the sending unit and the receiving unit in FIG. 8 may be implemented by the processor 1010 in FIG. 10 by triggering the communications interface 1040.

Figure 11:
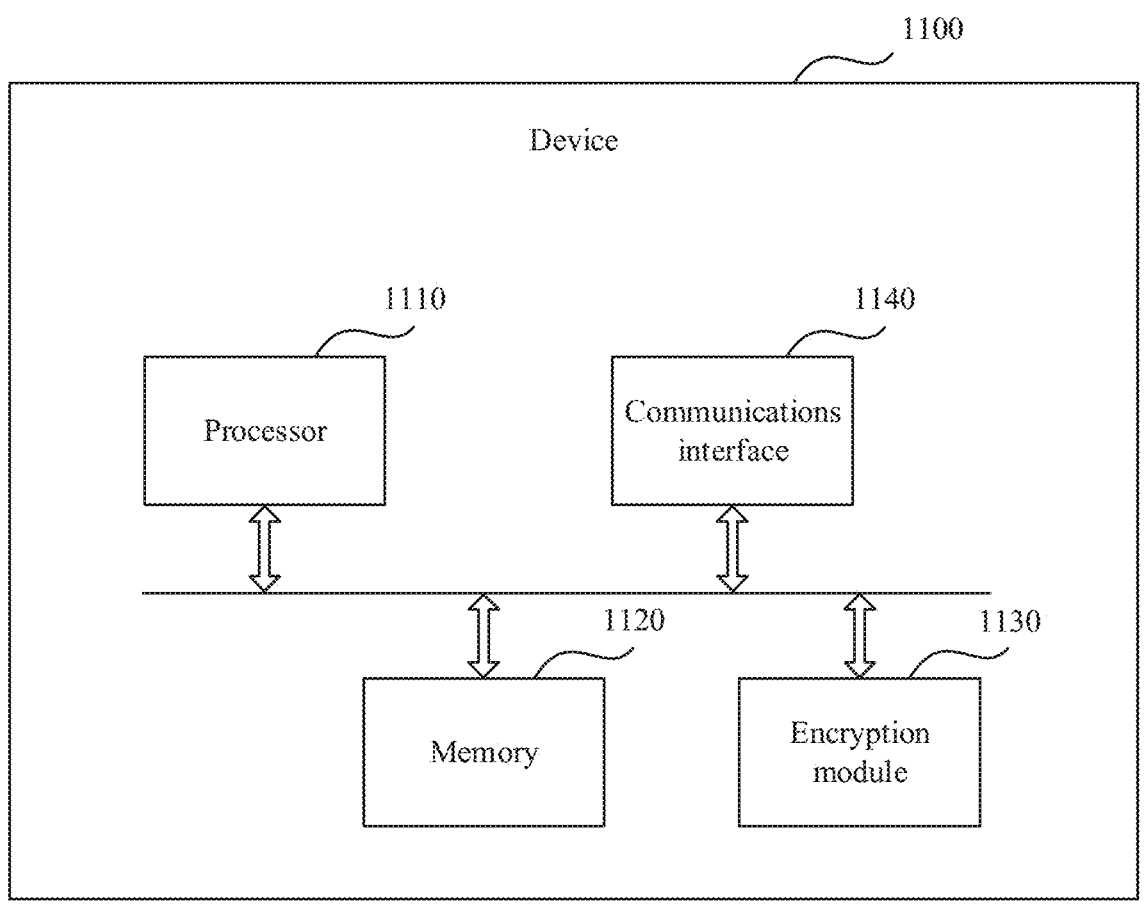
FIG. 11 is a schematic diagram of a structure of a device according to an embodiment of this application.

In a simple embodiment, the internet of vehicles device 300 may alternatively be in a form shown in FIG. 11.

A device 1100 shown in FIG. 11 includes at least one processor 1110, a memory 1120, and an encryption module 1130, and optionally, may further include a communications interface 1140.

The memory 1120 is similar to the memory 920. Refer to the foregoing descriptions of the memory 920. Details are not described herein again.

In this embodiment of this application, a specific connection medium between the processor 1110 and the memory 1120 is not limited.

The device shown in FIG. 11 further includes the communications interface 1140, and when communicating with another device, the processor 1110 may perform data transmission by using the communications interface 1140.

When the internet of vehicles device 300 uses the form shown in FIG. 11, the processor 1110 in FIG. 11 may invoke a computer-executable instruction stored in the memory 1120, so that the device 1100 can perform the method performed by the internet of vehicles device 300 in any one of the foregoing method embodiments. For example, the device 1100 may perform the method performed by the internet of vehicles device 300 in step 401 and step 403 in the method embodiment shown in FIG. 4.

Further, functions/implementation processes of the sending unit and the receiving unit in FIG. 7 may all be implemented by the processor 1110 in FIG. 11 by invoking the computer-executable instruction stored in the memory 1120, and a function/an implementation process of the encryption unit may all be implemented by the encryption module 1130 in FIG. 11. Alternatively, a function/an implementation process of the encryption unit in FIG. 7 may be implemented by the encryption module 1130 in FIG. 11, and functions/implementation processes of the sending unit and the receiving unit in FIG. 7 may be implemented by the processor 1110 in FIG. 11 by invoking the computer-executable instruction stored in the memory 1120 to trigger the communications interface 1140.

It should be understood that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc (CD) ROM (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the embodiments of this application without departing from the scope of this application. This application is intended to cover these modifications and variations provided that they fall within the scope of protection defined by the following claims and their equivalent technologies.

What is claimed is:

1. A method implemented by a first device in internet of vehicles devices, and wherein the method comprises:
   receiving, from a second device in the internet of vehicles devices, a data request for first data, wherein the data request comprises an identifier of the second device and a first category of the first data;
   encrypting the first data based on an identifier public key to obtain encrypted first data, wherein the identifier public key comprises the identifier, the first category, and a time condition to be met by the second device to decrypt the encrypted first data within a first time period; and
   sending, to the second device, a data response comprising identifier public key indication information and the encrypted first data,
   wherein the identifier public key indication information identifies the identifier public key.

2. The method of claim 1, wherein the identifier public key further comprises time information indicating a valid time associated with the identifier public key.

3. The method of claim 1, wherein before encrypting the first data, the method further comprises determining that the first category belongs to a preset category of information that is to be encrypted.

4. The method of claim 1, wherein before encrypting the first data, the method further comprises:
   displaying, to a user, a prompt to determine whether the first data needs to be encrypted; and
   receiving an indication from the user indicating that the first device needs to encrypt the first data.

5. The method of claim 1, wherein the data request further comprises a request for second data, wherein the identifier public key further comprises a second category of the second data, and wherein the method further comprises:
   encrypting a data assembly based on the identifier public key to obtain an encrypted data assembly, wherein the data assembly comprises the first data and the second data; and
   further sending, to the second device, the data response comprising the identifier public key and the encrypted data assembly.

6. A method implemented by a second device in internet of vehicles devices, and wherein the method comprises:
   sending, to a first device in the internet of vehicles devices, a data request for first data, wherein the data request comprises an identifier of the second device and a first category of the first data;
   receiving, from the first device, a data response comprising identifier public key indication information and encrypted first data, wherein the identifier public key indication information identifies an identifier public key, wherein the encrypted first data is based on the identifier public key, and wherein the identifier public key comprises a time condition to be met by the second device to decrypt the encrypted first data within a first time period; and
   decrypting the encrypted first data based on an identifier private key corresponding to the identifier public key to obtain the first data.

7. The method of claim 6, wherein the identifier public key comprises time information indicating a valid time associated with the identifier public key.

8. The method of claim 6, wherein before decrypting the encrypted first data, the method further comprises:
   sending an identifier private key request comprising the identifier public key to a key management center when the second device does not store the identifier private key; and
   obtaining, from the key management center, the identifier private key.

9. The method of claim 8, wherein the identifier private key request further comprises additional information from the second device indicating that the second device meets the additional condition.

10. The method of claim 9, wherein the additional information comprises location information of the second device when the additional condition is a location condition.

11. The method of claim 6, wherein before decrypting the encrypted first data, the method further comprises:
   obtaining, from a key management center, an identifier private key set;
   locally storing the identifier private key set; and
   selecting, from the identifier private key set and based on the identifier public key, the identifier private key.

12. The method of claim 6, wherein the data request further comprises a request for second data, wherein the identifier public key further comprises a second category of the second data, and wherein the method further comprises:
   further receiving, from the first device, the data response comprising the identifier public key and an encrypted data assembly, and wherein the encrypted data assembly comprises the encrypted first data and encrypted second data; and
   decrypting the encrypted data assembly based on the identifier private key to obtain the first data and the second data.

13. A first device comprising:
   a memory configured to store instructions; and
   a processor coupled to the memory, wherein the instructions cause the processor to be configured to:
      receive, from a second device, a data request for first data, wherein the data request comprises an identifier of the second device and a first category of the first data;
      encrypt the first data based on an identifier public key to obtain encrypted first data, wherein the identifier public key comprises the identifier, the first category, and a time condition to be met by the second device to decrypt the encrypted first data within a first time period; and
      send, to the second device, a data response comprising identifier public key indication information and the encrypted first data,
      wherein the identifier public key indication information indicates the identifier public key.

14. The first device of claim 13, wherein the data request further comprises a request for second data, wherein the identifier public key further comprises a second category of the second data, and wherein the instructions further cause the processor to be configured to:
   encrypt, based on the identifier public key, a data assembly comprising the first data and the second data to obtain an encrypted data assembly; and
   further send the data response to the second device, and wherein the data response comprises the identifier public key and the encrypted data assembly.

15. A second device comprising:
   a memory configured to store instructions; and
   a processor coupled to the memory, wherein the instructions cause the processor to be configured to:
      send, to a first device, a data request for first data, wherein the data request comprises an identifier of the second device and a first category of the first data;
      receive, from the first device, a data response comprising identifier public key indication information and encrypted first data, wherein the identifier public key indication information identifies an identifier public key, wherein the encrypted first data is based on the identifier public key, and wherein the identifier public key comprises a time condition to be met by the second device to decrypt the encrypted first data within a first time period; and
      decrypt the encrypted first data based on an identifier private key corresponding to the identifier public key to obtain the first data.

16. The second device of claim 15, wherein the data request further comprises a request for second data, wherein the identifier public key further comprises a second category of the second data, wherein the instructions further cause the processor to be configured to:
   further receive the data response comprising the identifier public key and an encrypted data assembly, wherein the encrypted data assembly comprises the encrypted first data and encrypted second data; and
   decrypt the encrypted data assembly based on the identifier private key to obtain the first data and the second data.

17. The second device of claim 15, wherein the identifier public key comprises time information indicating a valid time associated with the identifier public key.

18. The second device of claim 15, wherein the instructions further cause the processor to be configured to:
  send an identifier private key request comprising the identifier public key to a key management center when the second device does not store the identifier private key; and
  obtain, from the key management center, the identifier private key.

19. The second device of claim 15, wherein the identifier private key request further comprises additional information from the second device indicating that the second device meets the additional condition.

20. The second device of claim 15, wherein the instructions further cause the processor to be configured to:
  obtain, from a key management center, an identifier private key set;
  locally store the identifier private key set; and
  select, from the identifier private key set and based on the identifier public key, the identifier private key.

* * * * *